United States Patent
Cho

(10) Patent No.: US 10,748,048 B2
(45) Date of Patent: Aug. 18, 2020

(54) COIL MODULE INCLUDING A UPPER COIL, A LOWER COIL, A LOWER OUTER PATTERN OUTSIDE THE LOWER COIL, AND A LOCAL AREA COMMUNICATIONS COIL OUTSIDE THE LOWER COIL

(71) Applicant: WITS Co., Ltd., Yongin-si, Gyeonggi-do (KR)

(72) Inventor: Jae Hyoung Cho, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 165 days.

(21) Appl. No.: 15/983,196

(22) Filed: May 18, 2018

(65) Prior Publication Data
US 2019/0012585 A1 Jan. 10, 2019

(30) Foreign Application Priority Data

Jul. 7, 2017 (KR) .......... 10-2017-0086604
Sep. 27, 2017 (KR) .......... 10-2017-0125164

(51) Int. Cl.
*G06K 19/06* (2006.01)
*H01Q 1/36* (2006.01)
*H01Q 7/00* (2006.01)
*H04B 5/00* (2006.01)

(52) U.S. Cl.
CPC .......... *G06K 19/06196* (2013.01); *H04B 5/00* (2013.01); *H04B 5/0031* (2013.01); *H04B 5/0037* (2013.01); *H04B 5/0081* (2013.01)

(58) Field of Classification Search
CPC .. G06K 19/06196; H04B 5/00; H04B 5/0031; H01Q 1/36; H01Q 7/00

USPC .......................................................... 235/493
See application file for complete search history.

(56) References Cited

U.S. PATENT DOCUMENTS

| | | | |
|---|---|---|---|
| 2016/0137072 A1 | 5/2016 | Lee et al. | |
| 2016/0253651 A1* | 9/2016 | Park ................. | G07F 9/023 705/39 |
| 2017/0005519 A1 | 1/2017 | Lee et al. | |
| 2017/0017938 A1* | 1/2017 | Lee .................. | G06K 19/07773 |
| 2017/0047636 A1 | 2/2017 | Lee et al. | |

FOREIGN PATENT DOCUMENTS

| | | |
|---|---|---|
| JP | 2006-279669 A | 10/2006 |
| KR | 10-1574322 B1 | 12/2015 |
| KR | 10-2017-0004834 A | 1/2017 |
| KR | 10-2017-0018646 A | 2/2017 |
| KR | 10-1697126 B1 | 2/2017 |
| KR | 10-1719040 B1 | 3/2017 |

OTHER PUBLICATIONS

Korean Office Action dated Oct. 16, 2018 in corresponding Korean Patent Application No. 10-2017-0125164 (7 pages in English and 5 pages in Korean).

* cited by examiner

*Primary Examiner* — Toan C Ly
(74) *Attorney, Agent, or Firm* — Harness, Dickey & Pierce, P.L.C.

(57) ABSTRACT

A coil module includes a substrate; an upper coil disposed on at least one surface of the substrate in an upper portion of the substrate; a lower coil disposed on at least one surface of the substrate in a lower portion of the substrate; and a lower outer pattern disposed on an outer side of the lower coil in the lower portion of the substrate and connected to either one or both of the upper coil and the lower coil.

20 Claims, 23 Drawing Sheets

COIL MODULE INCLUDING A UPPER COIL, A LOWER COIL, A LOWER OUTER PATTERN OUTSIDE THE LOWER COIL, AND A LOCAL AREA COMMUNICATIONS COIL OUTSIDE THE LOWER COIL

CROSS-REFERENCE TO RELATED APPLICATIONS

This application claims the benefit under 35 USC 119(a) of Korean Patent Application Nos. 10-2017-0086604 filed on Jul. 7, 2017, and No. 10-2017-0125164 filed on Sep. 27, 2017, in the Korean Intellectual Property Office, the entire disclosures of which are incorporated herein by reference for all purposes.

BACKGROUND

1. Field

This application relates to a coil module.

2. Description of Related Art

In accordance with a trend of providing multifunctionality in mobile terminals, various coils have been used in the mobile terminals. For example, wireless charging coils for wireless charging and coils for wireless communications have been used in mobile terminals.

In addition, a magnetic secure transmission (MST) technology enabling wireless communication directly with a magnetic card reader to perform a payment has recently been implemented in mobile terminals, so a coil for MST has been included in mobile terminals.

Thus, to provide various functions needing a coil in a mobile terminal, it is necessary to mount various types of coils in the mobile terminal.

However, mounting various types of coils in a mobile terminal conflicts with a trend toward miniaturization and slimness in mobile terminals.

In addition, to implement other functions in a mobile terminal, other modules, for example, a camera module and a sensor module, are added to the mobile terminal in addition to the various types of coils, complicating a layout of the mobile terminal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a coil module includes a substrate; an upper coil disposed on at least one surface of the substrate in an upper portion of the substrate; a lower coil disposed on at least one surface of the substrate in a lower portion of the substrate; and a lower outer pattern disposed on an outer side of the lower coil in the lower portion of the substrate and connected to either one or both of the upper coil and the lower coil.

A portion of the lower outer pattern may have a shape corresponding to a shape of at least a portion of the lower coil.

The upper coil may form a first loop in the upper portion of the substrate, and the lower coil may form a second loop in the lower portion of the substrate.

The lower outer pattern may form a third loop outside the second loop in the lower portion of the substrate.

The upper coil may be configured to enable a current to flow in a first direction in the first loop, and the lower coil and the lower outer pattern may be configured to enable a current to flow in a second direction opposite to the first direction in the second loop and the third loop.

The upper coil, the lower coil, and the lower outer pattern may be configured to enable a current to flow in a same direction in the first loop, the second loop, and the third loop.

The upper coil may form a first loop in the upper portion of the substrate, and a portion of the upper coil may be connected in series with the lower outer pattern to form, together with the lower outer pattern, a third loop in the upper portion of the substrate and the lower portion of the substrate.

One end of the lower outer pattern may be connected to one end of the upper coil.

One end of the lower outer pattern may be connected to one end of the lower coil.

One end of the lower outer pattern may be connected to one end of the upper coil, another end of the lower outer pattern may be connected to one end of an outer portion of the lower coil, and the lower coil may be wound from the outer portion of the lower coil to an inner portion of the lower coil.

The upper coil may form a first loop in the upper portion of the substrate and the lower portion of the substrate, the lower coil may form a second loop in the lower portion of the substrate, and the lower outer pattern may be a portion of the upper coil in the lower portion of the substrate.

The second loop may be disposed inside the first loop, and the upper coil and the lower coil may be configured to enable a current to flow in a same direction in the first loop and the second loop.

At least a portion of the upper coil may overlap at least a portion of the lower coil.

The lower coil may be configured to be activated in response to the coil module operating in a wireless power reception mode, and the upper coil, the lower coil, and the lower outer pattern may be configured to be activated in response to the coil module operating in a magnetic secure transmission mode.

In another general aspect, a coil module includes a substrate; an upper coil disposed on at least one surface of the substrate in an upper portion of the substrate; and a lower coil disposed on at least one surface of the substrate in a lower portion of the substrate, wherein the lower coil has an asymmetrical shape in which an area of an upper portion of the lower coil is different from an area of a lower portion of the lower coil.

The lower coil may have a plurality of turns and a substantially circular shape, and an arc of a lower hemisphere of the substantially circular shape may be longer than an arc of an upper hemisphere of the substantially circular shape.

In another general aspect, a coil module includes a substrate; a first coil disposed in a first portion of the substrate; a second coil disposed in a second portion of the substrate; and an outer pattern disposed outside the second coil in the second portion of the substrate and connected to either one or both of the first coil and the second coil.

The first portion of the substrate and the second portion of the substrate may abut each other at a boundary between the first portion of the substrate and the second portion of the substrate, the first portion of the substrate may extend from a first edge of the substrate to the boundary between the first portion of the substrate and the second portion of the substrate, and the second portion of the substrate may extend from a second edge of the substrate to the boundary between the first portion of the substrate and the second portion of the substrate.

One end of the first coil may be connected to a first end of the outer pattern, and a second end of the outer pattern may be connected to one end of the second coil, thereby enabling a current to flow sequentially through the first coil, the outer pattern, and the second coil.

The first coil may form a first loop in the first portion of the substrate, the second coil may form a second loop in the second portion of the substrate, the outer pattern may form a third loop in the second portion of the substrate outside the second loop, either by itself or in conjunction with at least a portion of the first coil, and the first coil, the second coil, and the outer pattern may be configured to enable the current to flow in a first direction in the first loop and a second direction opposite to the first direction in the second loop and the third loop, or to flow in a same direction in the first loop, the second loop, and the third loop.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
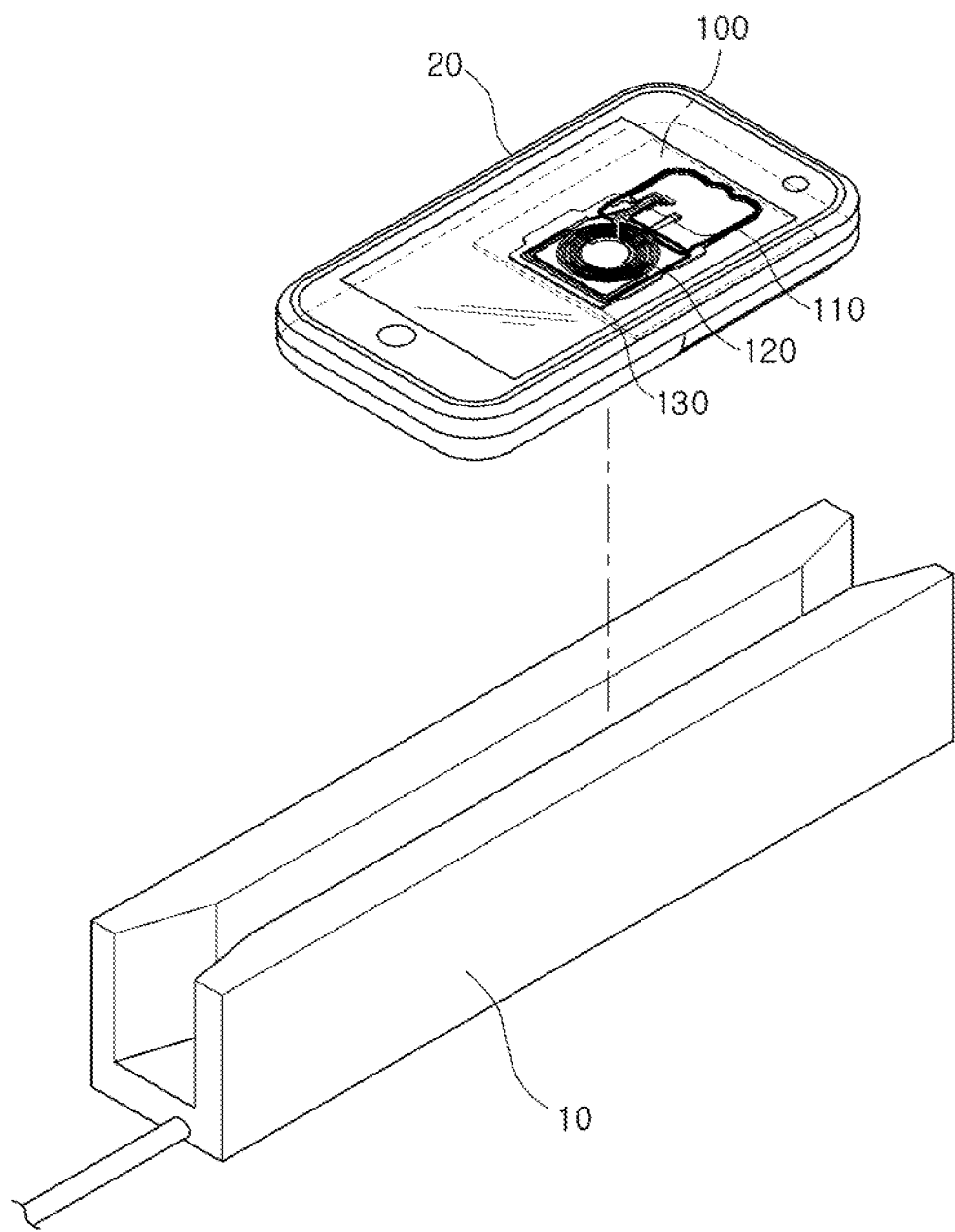
FIG. 1 is a view illustrating an example of an application of a coil module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, various examples of a coil module applicable to a mobile terminal will be described.

The coil module to be described below includes a plurality of coils, and the plurality of coils may operate separately or together to support a specific function.

Hereinafter, a description will be provided based on examples in which the coil module supports a wireless power reception function and a magnetic secure transmission (MST) function that wirelessly transmits magnetic card information and performs a payment, but these functions may be replaced by other functions in other examples.

FIG. 1 is a view illustrating an example of an application of a coil module.

A coil module 100 is applied to a mobile terminal 20.

The coil module 100 may be a component that is applied integrally to the mobile terminal 20, or a component that is coupled to the mobile terminal 20.

The coil module 100 supports a plurality of wireless functions.

In one example, the coil module 100 supports a wireless power reception function and a magnetic secure transmission (MST) function. In another example, the coil module 100 additionally supports a near field communication (NFC) function for local area wireless communications.

The coil module 100 includes a plurality of coils, and uses a combination of all or some of the plurality of coils depending on the supported functions.

FIG. 1 illustrates an example in which the coil module 100 supports the magnetic secure transmission (MST) function using the plurality of coils.

MST is a function in which the coil module 100 is magnetically coupled to a magnetic card reader 10 to provide magnetic card information to the magnetic card reader 10.

The magnetic card reader 10 may be magnetically coupled to a magnetic stripe of a magnetic card to acquire the magnetic card information from the magnetic card.

The MST enables the coil module 100 to have magnetic characteristics similar to the magnetic stripe under the control of the mobile terminal 20. That is, similarly to a case in which the magnetic card reader 10 is magnetically coupled to the magnetic card, the magnetic card reader 10 is magnetically coupled to the coil module 100 through a magnetic field provided by the coil module 100 to receive the magnetic card information.

For example, the coil module 100 forms a magnetic field and the formed magnetic field generates a voltage across a magnetic head of the magnetic card reader 10, enabling the coil module 100 to wirelessly transmit the magnetic card information to the magnetic card reader 10.

Figure 2:
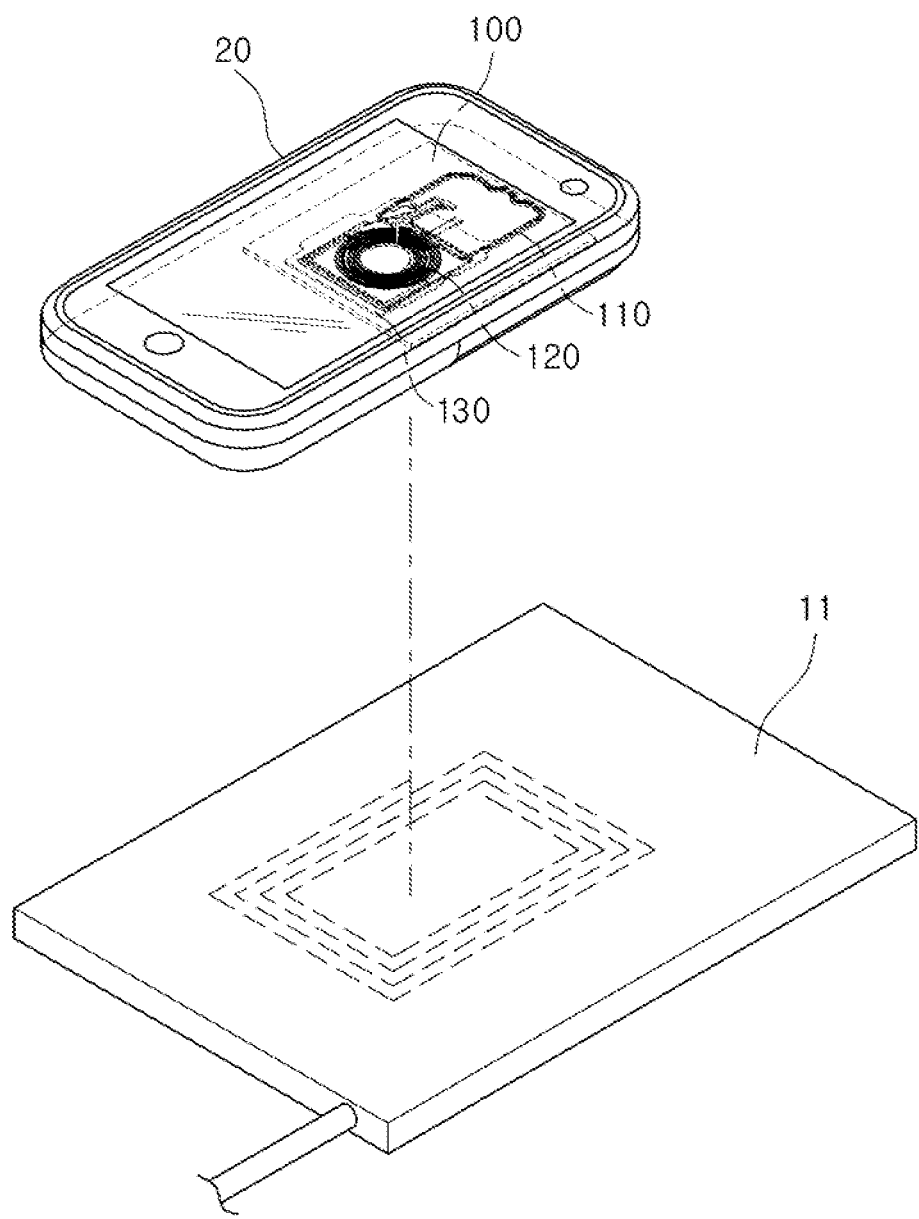
FIG. 2 is a view illustrating another example of an application of a coil module.

FIG. 2 is a view illustrating another example of an application of a coil module, FIG. 2 illustrates an example in which the coil module 100 supports the wireless power reception function.

In the illustrated example, the coil module 100 supports the wireless power reception function using only a portion of the plurality of coils to wirelessly receive power from a wireless power transmission coil 11.

Thus, the coil module 100 includes the plurality of coils, and uses at least a portion or all of the plurality of coils depending on the function being supported.

Although FIGS. 1 and 2 illustrate that the coil module 100 is adjacent to an upper portion of the mobile terminal 20, this is merely one example, and the position of the coil module 100 is not limited thereto. Therefore, the coil module 100 may be located at any position in the mobile terminal 20.

In addition, although FIGS. 1 and 2 illustrate that the coil module 100 is smaller than an area of the mobile terminal 20, this is also merely one example, and the size of the coil module 100 is not limited thereto. Therefore, the coil module 100 may have an area corresponding to an area of the mobile terminal 20.

As illustrated in FIGS. 1 and 2, the coil module 100 includes an upper coil 110 formed in an upper portion of a coil module substrate 170 (hereinafter, referred to as a "substrate"), a lower coil 120 formed in a lower portion of the substrate, and a lower outer pattern 130 connected to at least one of the upper coil 110 and the lower coil 120 and extending to the lower portion of the substrate.

The coil module 100 includes the lower outer pattern 130, thereby efficiently forming a magnetic field even in a lower portion of the coil module 100 or the mobile terminal 20 in which it is relatively difficult to form the magnetic field. Accordingly, a recognition rate of a wireless function, for example, a recognition rate of the MST, may be increased even in the lower portion of the mobile terminal 20 compared to a coil module that does not include the lower outer pattern.

Hereinafter, various examples of the coil module 100 will be described with reference to FIGS. 3A through 14.

Figure 3A:
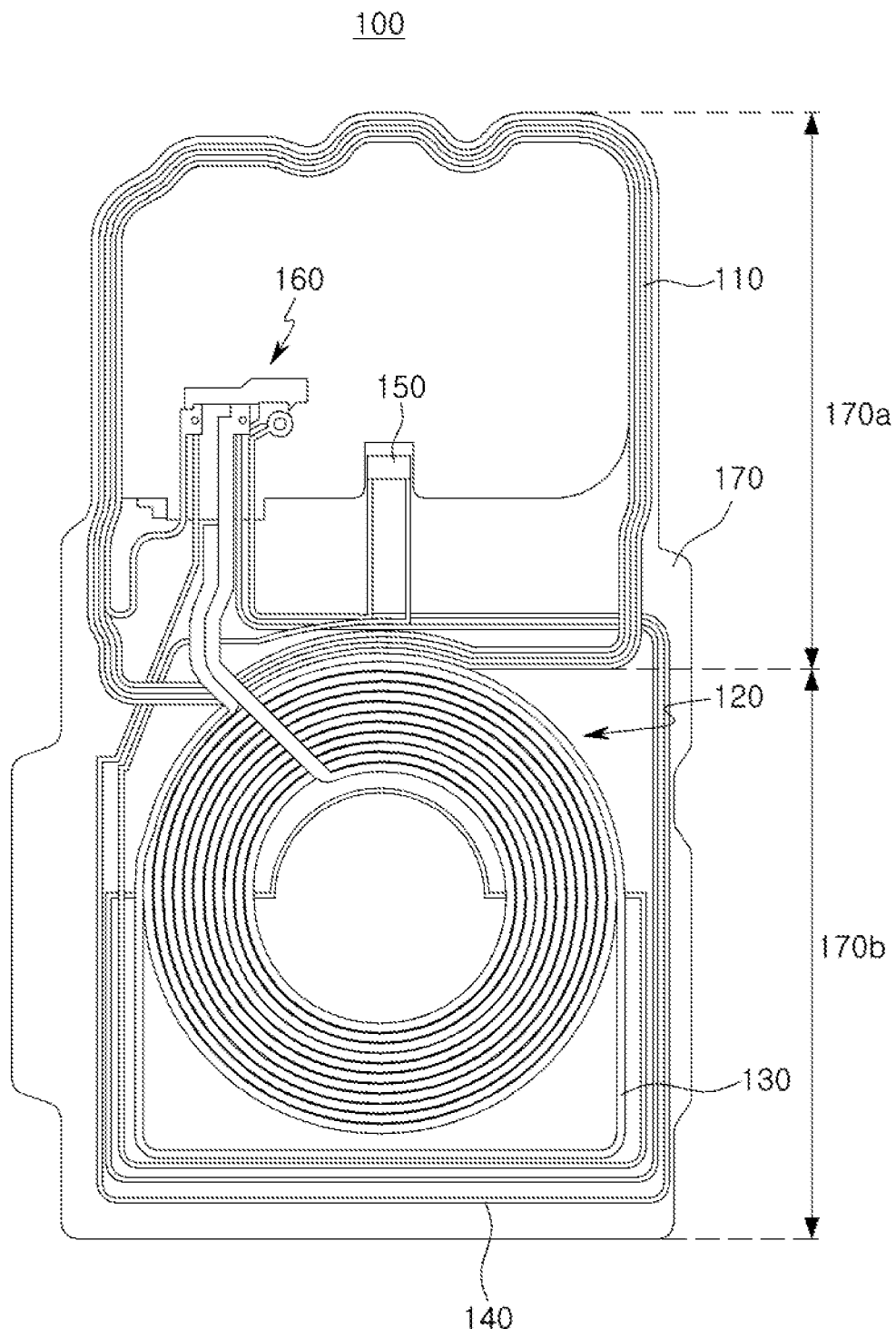
FIG. 3A is a view illustrating an example of a coil module.

FIG. 3A is a view illustrating an example of a coil module.

Referring to FIG. 3A, the coil module 100 includes a substrate and a plurality of coils 110, 120, and 140 and a lower outer pattern 130 formed on one surface of the substrate or both surfaces of the substrate. Therefore, FIG. 3A illustrates an appearance of an entire coil viewed in a direction perpendicular to the plane of FIG. 3A without considering an upper surface or a lower surface of the substrate.

In the illustrated example, the coil module 100 includes an upper coil 110, a lower coil 120, and a local area communications coil 140.

The upper coil 110 is formed in an upper portion 170a of the substrate 170. The upper coil 110 may include a conductive pattern formed on one surface of the substrate, or conductive patterns formed on both surfaces of the substrate and connected together by at least one via penetrating through the substrate.

In one example, the upper coil 110 has a smaller area or number of turns than the lower coil 120. In another example, an inner region of the upper coil 110 is larger than that of the lower coil 120.

In the illustrated example, the upper portion of the substrate has a shape corresponding to the shape of the upper coil 110. Therefore, the substrate may also have an empty space in the inner region of the upper coil 110. Therefore, since an inner space of the upper coil 110 becomes a very wide empty space, other modules (e.g., one or more camera modules) of the mobile terminal may be positioned in the empty space.

That is, the inner space of the upper coil 110 may be formed to be sufficiently large to greatly increase a degree of freedom of layout of other modules of the mobile terminal in the inner space. For example, a plurality of camera modules may be disposed horizontally or vertically in the inner space of the upper coil 110, so the degree of freedom of a design of the mobile terminal is increased.

The lower coil 120 is formed on at least one surface of the substrate 170 in a lower portion 170b of the substrate 170.

The lower coil 120 has an area larger than that of other coils. The lower coil 120 provides a strong magnetic coupling. The lower coil 120 is used to support a wireless power reception function (hereinafter, referred to as a "wireless power reception mode").

In one example, the lower coil 120 has 5 turns to 30 turns, but is not limited thereto. In one example, the lower coil 120 includes conductive patterns formed on both surfaces of the substrate and connected together by at least one via.

In one example, the lower coil 120 is used as a wireless charging coil when wireless charging is performed, and is used as an MST coil when the MST is performed. The usage of the lower coil 120 can be set differently according to each of the functions by changing a connection state of the lower coil 120 through a switching adjustment at a terminal part 160 of the mobile terminal.

The lower outer pattern 130 is a pattern connected to at least one of the upper coil 110 and the lower coil 120 and extending to the lower portion of the substrate 170.

In one example, the lower outer pattern 130 is formed at an outer side of the lower coil 120 in the lower portion 170b of the substrate 170. The lower outer pattern 130 has a smaller number of turns than the lower coil 120.

The lower outer pattern 130 is used to support the MST function. Therefore, the lower outer pattern 130 has a smaller area or number of turns than the lower coil 120 used to receive wireless power for wireless charging.

Figure 4A:
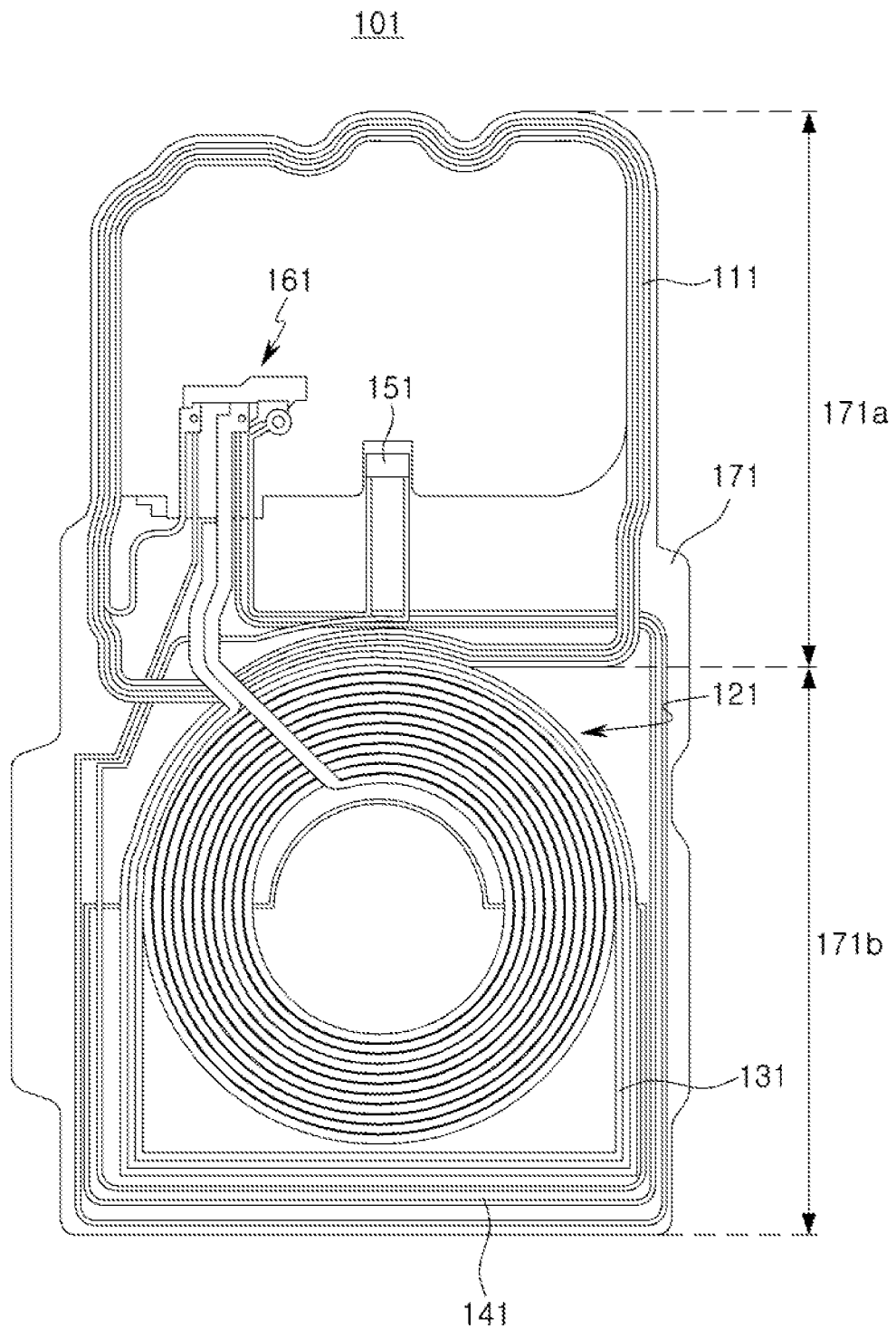
FIG. 4A is a view illustrating another example of a coil module.

In the illustrated example, the lower outer pattern 130 has one turn, but this is merely one example, and various modified examples are also possible (see, for example FIG. 4A).

A shape of the lower outer pattern 130 may correspond to a shape of a lower end portion of the coil module 100, or may correspond to a shape of a portion of the mobile terminal including the coil module.

In one example, a portion of the lower outer pattern 130 has a shape corresponding to at least a portion of the lower coil, and the other portion of the lower outer pattern 130 has a shape corresponding to a shape of the lower end portion of the substrate.

That is, in the illustrated example, an upper portion of the lower outer pattern 130 has a shape of a circular arc wrapped around an upper portion of the lower coil 120, and a lower portion of the lower outer pattern 130 has a shape corresponding to the shape of the lower end portion of the substrate.

As such, since the lower outer pattern 130 is formed at the outer side of the lower coil 120, the magnetic field may be formed even in a region corresponding to the lower end portion of the mobile terminal.

In one example, when the lower outer pattern 130 operates as an MST coil, it is connected in series with the lower coil 120 and the upper coil 110 to be operate as an MST coil, but when the lower coil 120 is used as the wireless charging coil, the lower outer pattern 130 is not connected to the lower coil 120 and does not operate as a wireless charging coil.

A connection relationship of the upper coil 110, the lower coil 120, and the lower outer pattern 130 may be changed according to an electrical connection setting at the terminal part 160.

In one example, both ends of the upper coil 110 and the lower coil 120 are connected to the terminal part 160, and a connection setting of the terminal part 160 in the mobile terminal is electrically changed through a switch or other device so that the upper coil 110 and the lower coil 120 are connected in series with each or in parallel with each other, or are not electrically connected to each other.

In addition, such a connection relationship may be differently set according to the functions of the mobile terminal. For example, in the wireless power reception function, the lower coil 120 is not electrically connected to other coils, but in the MST function, the lower coil 120 is connected in series with the upper coil 110.

In addition, various modified examples are possible other than the above-mentioned examples.

Each of the coils may have various loop forms.

In one example, the upper coil 110 forms a first loop in the upper portion 170a of the substrate, and the lower coil 120 forms a second loop in the lower portion 170b of the substrate.

One end of the lower outer pattern 130 is connected to one end of the lower coil 120 so that the lower outer pattern 130 is connected in series with the lower coil 120. In one example, the lower outer pattern 130 forms a third loop in the lower portion 170 of the substrate, and the second loop formed by the lower coil 120 is included in the third loop.

The coil module 100 further includes a local area communications coil 140.

The local area communications coil 140 is positioned in the lower portion of the coil module and is formed at the outer side of the lower coil 120. The local area communications coil 140 is formed to have a shape similar to a shape of the outer portion of the lower portion of the coil module 100.

The local area communications coil 140 may be used as an NFC coil. Since the NFC coil transmits or receives information, or receives a small amount of power, the local area communications coil 140 may have a smaller area or fewer turns than the lower coil 120.

The upper coil 110, the lower coil 120, and the local area communications coil 140 may be connected to the terminal part 160.

In one example, both ends of the upper coil 110, the lower coil 120, and the local area communications coil 140 are connected to the terminal part 160.

In another example, the upper coil 110 and the lower coil 120 are connected in series with each other, so that one end of the lower coil 120 and one end of the upper coil 110 are connected to each other, and the other end of the lower coil 120 and the other end of the upper coil 110 are connected to the terminal part 160.

In addition, the plurality of coils may have various other series or parallel connection combinations.

The coil module 110 includes a wiring 150 for connecting a module included in the mobile terminal to the terminal part 160. In one example, the mobile terminal includes a thermistor module, and the wiring 150 connects the thermistor module to the terminal part 160.

The coil module 100 may set different coils to operate in a wireless power reception mode supporting the wireless power reception function and an MST mode supporting the MST function.

For example, in a case in which the coil module 100 operates in the wireless power reception mode, the lower coil 120 is activated.

On the other hand, in a case in which the coil module 100 operates in the MST mode, the upper coil 110 and the lower outer pattern 130 are activated. Alternatively, the upper coil 110, the lower coil 120, and the lower outer pattern 130 are activated.

As such, the upper coil 110 and the lower outer pattern 130 are used together in the MST mode, so that the magnetic field for the MST function is formed in the entire region of the mobile terminal to increase a recognition rate of the magnetic secure transmission.

Figure 3B:
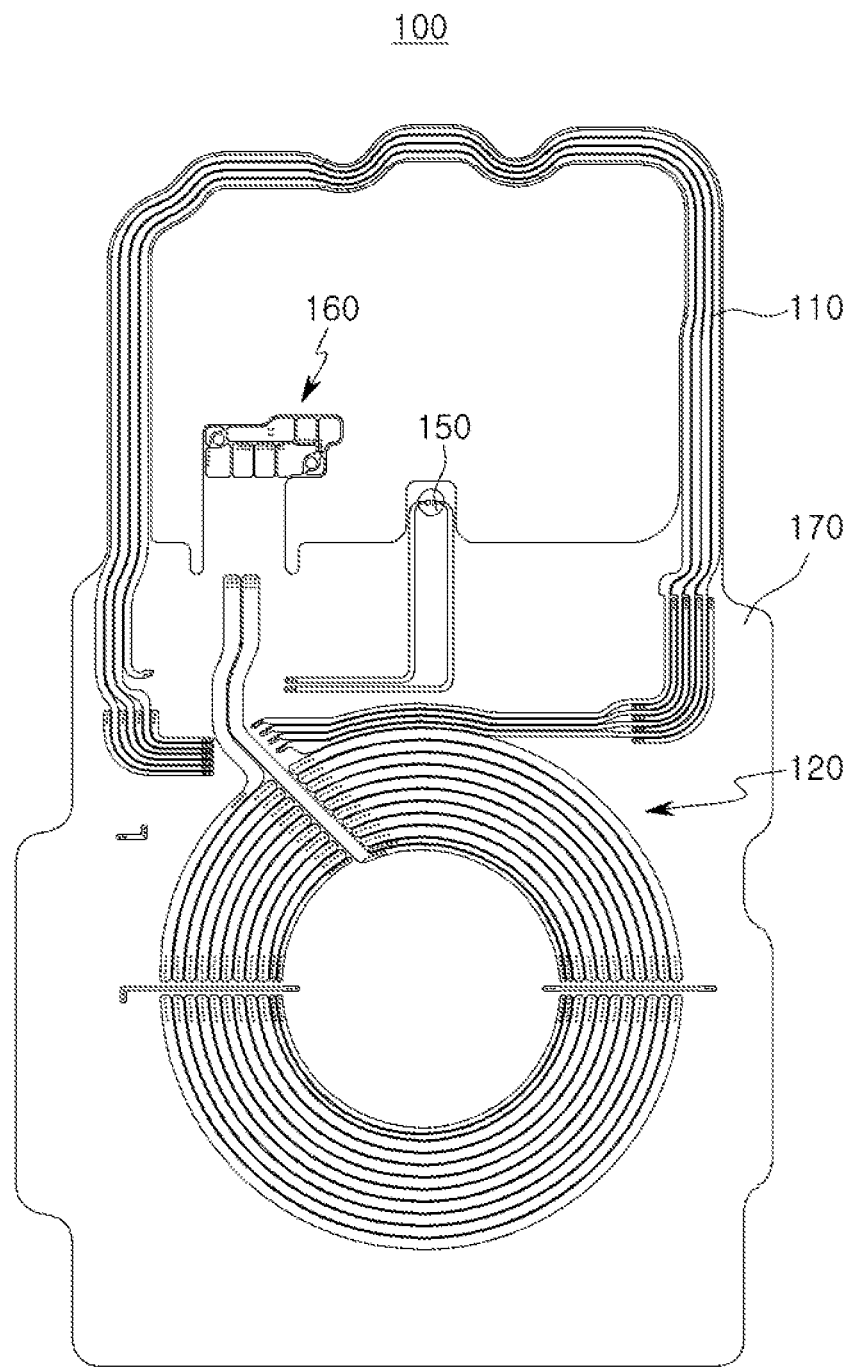
FIG. 3B is a view illustrating an example of a pattern of an upper surface of the coil module illustrated in FIG. 3A.
Figure 3C:
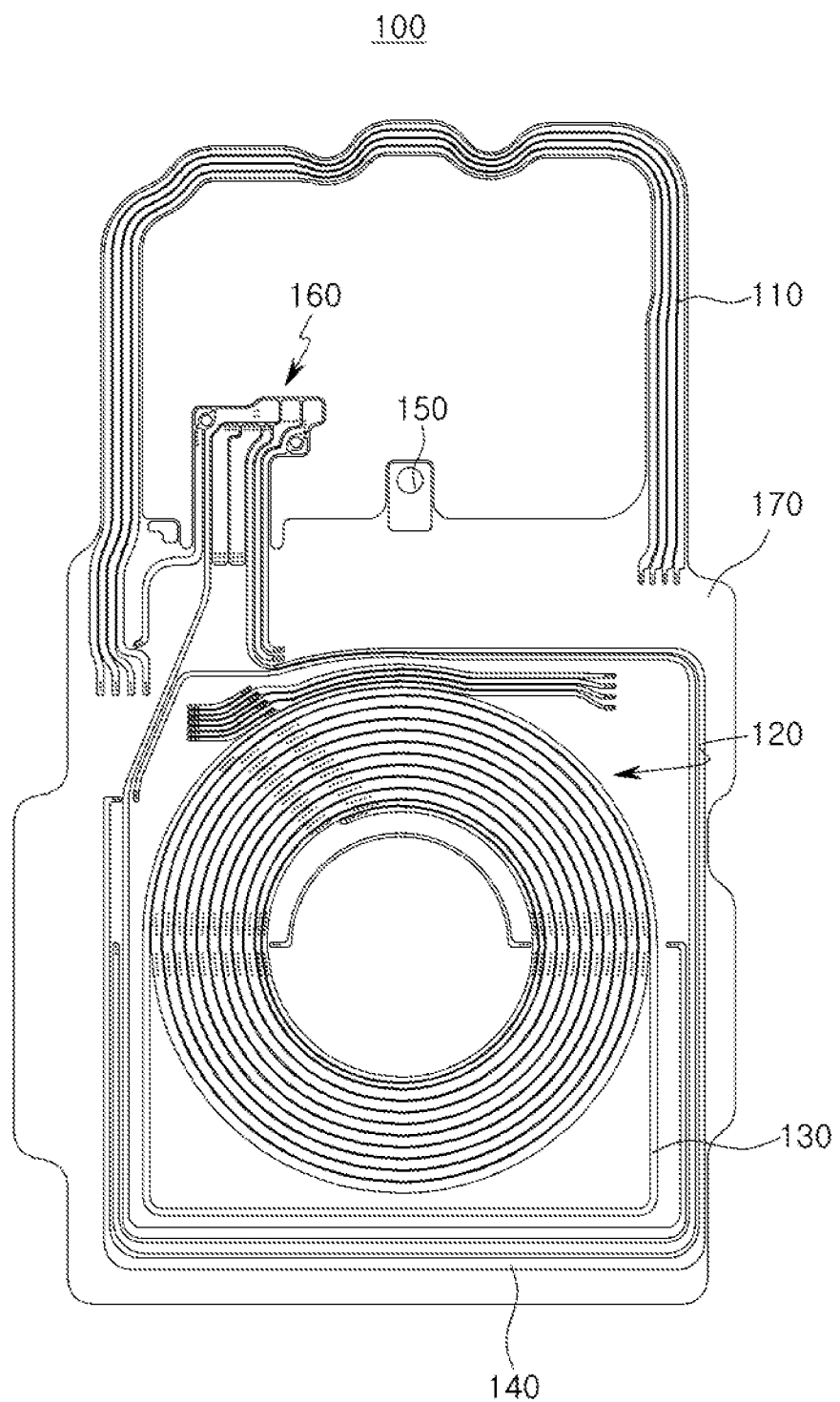
FIG. 3C is a view illustrating an example of a pattern of a lower surface of the coil module illustrated in FIG. 3A.

FIG. 3B is a view illustrating an example of a pattern of an upper surface of the coil module illustrated in FIG. 3A and FIG. 3C is a view illustrating an example of a pattern of a lower surface of the coil module illustrated in FIG. 3A.

As illustrated in FIGS. 3B and 3C, the upper coil 110 has several turns formed on the upper surface and the lower surface of the substrate.

In a region in which the upper coil 110 overlaps another coil, for example, the NFC coil 140, the upper coil 110 is bypass-connected to the upper surface of the substrate and the NFC coil 140 is formed on the lower surface of the substrate.

Since the lower coil 120 is used for wireless charging, the lower coil 120 is formed on both the upper surface and the lower surface of the substrate to have a sufficient number of turns. In a region in which the lower coil 120 overlaps another coil, for example, the NFC coil 140, the lower coil 120 is formed on the lower surface of the substrate and the NFC coil 140 is bypass-connected to the upper surface of the substrate.

The lower outer pattern 130 is connected to the lower coil 120. In the illustrated example, the lower outer pattern 130 is connected in series with one end of an outer portion of the lower coil 120.

Assuming that the lower outer pattern 130 is a portion of the lower coil 120, the lower outer pattern 130 is the outermost turn of the lower coil 120. That is, the lower outer pattern 130 is the outermost turn of the lower coil 120 and has a shape in which a portion of the lower pattern 130 extends toward the lower portion of the substrate.

As illustrated in FIGS. 3B and 3C, the coil module 100 is formed on the upper and lower surfaces of the substrate so as to be less affected by electrical influence among the plurality of coils.

However, since the patterns formed on the opposite surfaces of the substrate may be variously modified, a shape or a structure of the coil pattern is not limited to those illustrated in FIGS. 3B and 3C.

Figure 3D:
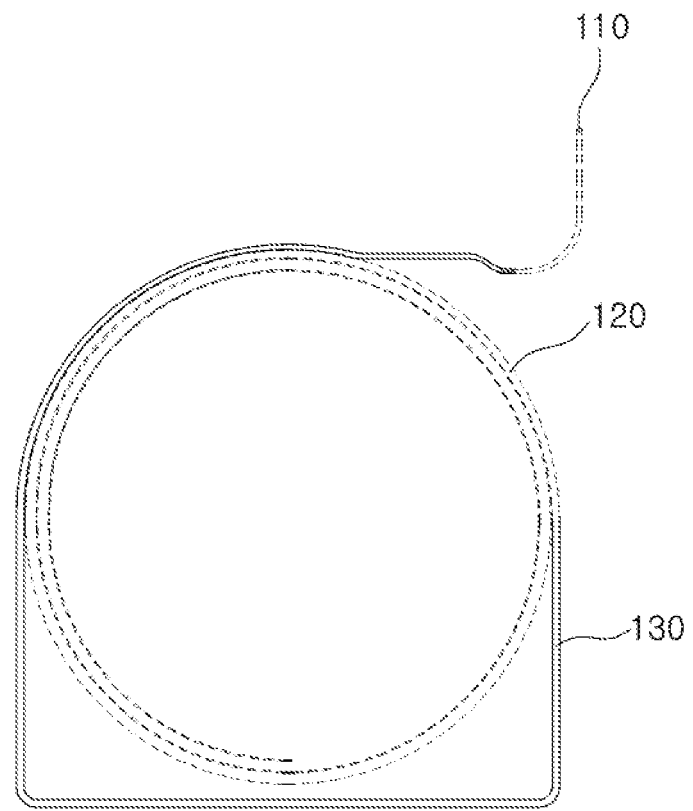
FIG. 3D is a view illustrating an example of a lower outer pattern and a portion of other coils connected to the lower outer pattern in the coil module illustrated in FIG. 3A.

FIG. 3D is a view illustrating an example of a lower outer pattern and a portion of other coils connected to the lower outer pattern in the coil module illustrated in FIG. 3A. In FIG. 3D, the lower outer pattern 130 is illustrated by solid lines.

Referring to FIG. 3D, one end of the lower outer pattern 130 is connected in series with one end of the upper coil 110, and the other end of the lower outer pattern 130 is connected in series with one end of an outer portion of the lower coil 120. The lower coil 120 is wound inwardly from the outer portion thereof. That is, the upper coil 110, the lower outer pattern 130, and the lower coil 120 are connected in series with each other in this order.

In FIG. 3D, the lower outer pattern 130 forms a line connecting one end of the upper coil 110 and one end of the lower coil 120 to each other. However, the shape, the connection relationship, and other features of the lower outer pattern 130 may be variously modified as will be described below.

Figure 4B:
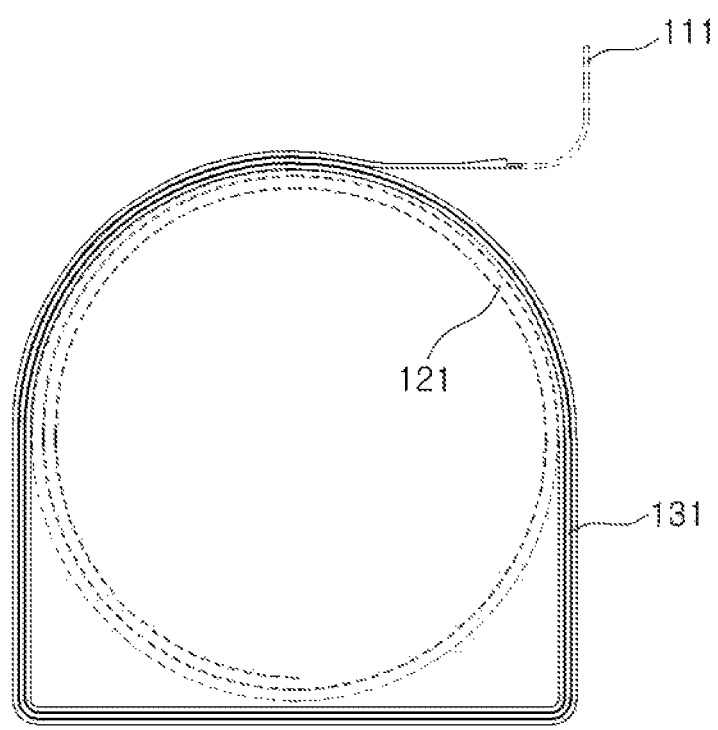
FIG. 4B is a view illustrating an example of a lower outer pattern and a portion of other coils connected to the lower outer pattern in the coil module illustrated in FIG. 4A.

FIG. 4A is a view illustrating another example of a coil module, and FIG. 4B is a view illustrating an example of a lower outer pattern and a portion of other coils connected to the lower outer pattern in the coil module illustrated in FIG. 4A.

Referring to FIG. 4A, a coil module 101 includes an upper coil 111 formed in an upper portion 171*a* of a substrate 171, a lower coil 121 and a lower outer pattern 131 formed in a lower portion 171*b* of the substrate 171, a local area communications coil 141, a wiring 151, and a terminal part 161.

Compared to the example of FIG. 3A, the example illustrated in FIG. 4A is a modified example in which the number of turns of the lower outer pattern 131 is increased the number of turns of the lower outer pattern 130 of the example of FIG. 3A.

Therefore, a structure in which an upper coil 111, the lower outer pattern 131, and lower coil 121 are connected in series with each other in this order is similar to that of FIG. 3A.

FIG. 4B is a view illustrating an example of a lower outer pattern and a portion of other coils connected to the lower outer pattern in the coil module illustrated in FIG. 4A. In FIG. 4B, the lower outer pattern 131 is illustrated by solid lines.

Referring to FIG. 4B, one end of the lower outer pattern 131 is connected to one end of the upper coil 111, and has several turns. The other end of the lower outer pattern 131 is connected to one end of an outer portion of the lower coil 121.

In one example, the lower outer pattern 131 is formed with three turns on one surface (an upper surface) of the substrate of the coil module 101, and is also formed with two to three turns on the other surface (a lower surface) of the substrate thereof. Therefore, the patterns formed on the upper surface and the lower surface of the substrate are connected in series with each other through at least one via so that the lower outer pattern 131 is generally formed with five turns to six turns.

According to such a modified example, the lower coil 121, the upper coil 111, and the lower outer pattern 131 are used as the MST coil, and a recognition region and a recognition accuracy of the MST coil may be increased by the lower outer pattern 131 having more turns than the lower outer pattern 130 in the example illustrated in FIGS. 3A through 3D.

Figure 5:
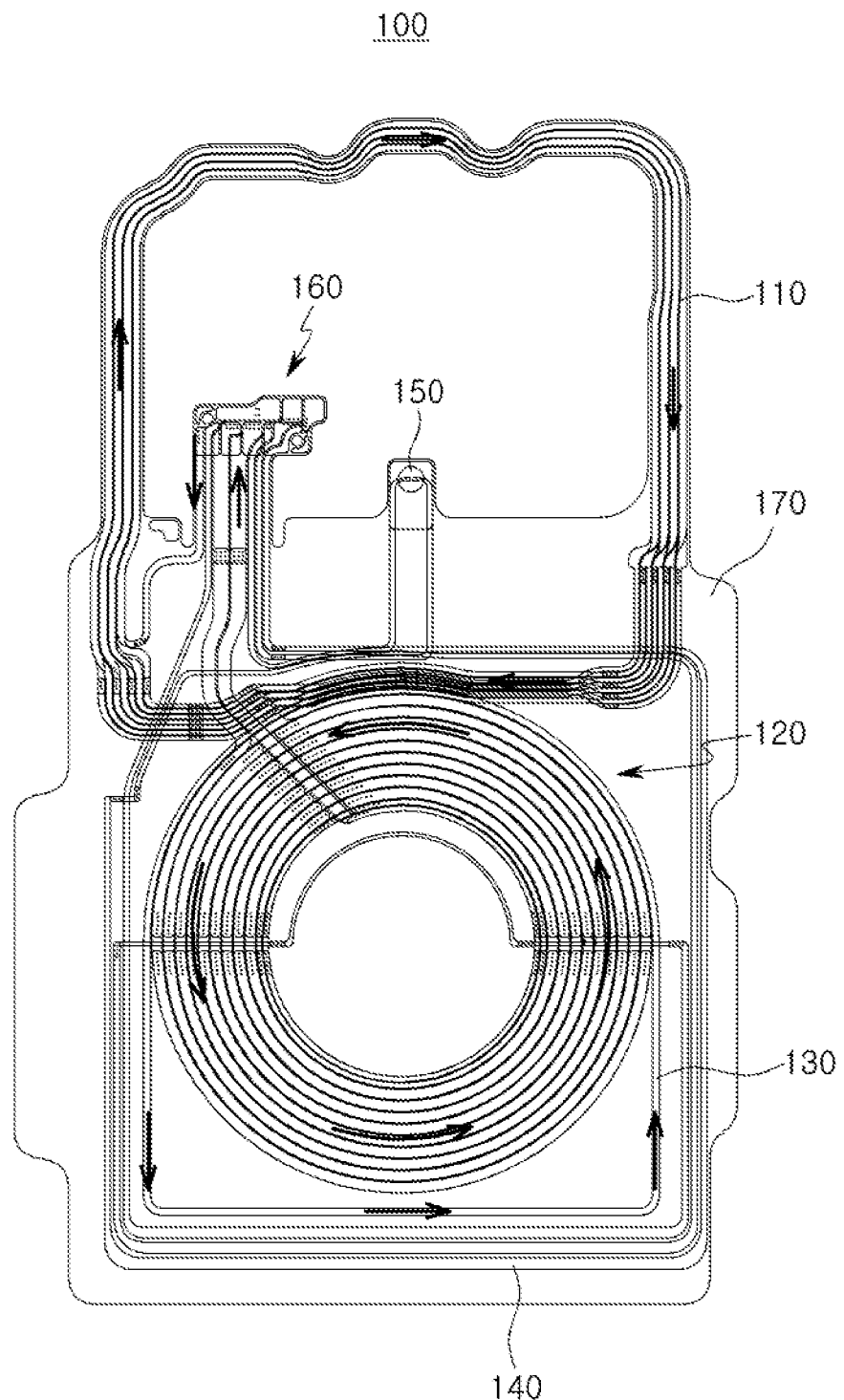
FIG. 5 is a view illustrating an example of a current flow when the coil module illustrated in FIG. 3 operates in a magnetic secure transmission mode.

FIG. 5 is a view illustrating an example of a current flow when the coil module illustrated in FIG. 3A operates in a magnetic secure transmission mode.

Referring to FIG. 5, a current is input to one end of the upper coil 110 via the terminal part 160, and the current flows through the turns of the upper coil 110. Since one end of the upper coil 110 is connected to the lower coil 120 through the lower outer pattern 130, the current flowing in the upper coil 110 flows through the lower outer pattern 130 and the lower coil 120, to the terminal part 160 and is output from the terminal part 160.

As such, the current flows n a figure-eight shape through the upper coil 110, the lower outer pattern 130, and the lower coil 120. Since a magnetic field is formed by the lower outer pattern 130 in the lower portion of the mobile terminal in which the strength of the magnetic field is relatively weak, the magnetic field is formed in the entire region of the mobile terminal.

In addition, as illustrated in FIG. 5, since the current flows in a clockwise direction in the upper coil 110 and flows in a counterclockwise direction in the lower coil 120 and the lower outer pattern 130, a portion of the magnetic field is a closed loop magnetic field passing through the center of the upper coil 110 in a first direction (a downward direction with respect to the plane of FIG. 5). and passing through the center of the lower coil 120 in a second direction (an upward direction with respect to the plane of FIG. 5) opposite to the first direction, that is, passing through the centers of the upper coil 110 and the lower coil 120.

The flow direction of the current illustrated in FIG. 5 is merely one example, and the flow of the current is not limited thereto. That is, the current may flow in a direction opposite to the illustrated direction.

As described above, the magnetic field covering a wide range may be formed using the two coils, as will be described in more detail with reference to FIG. 6.

Figure 6:
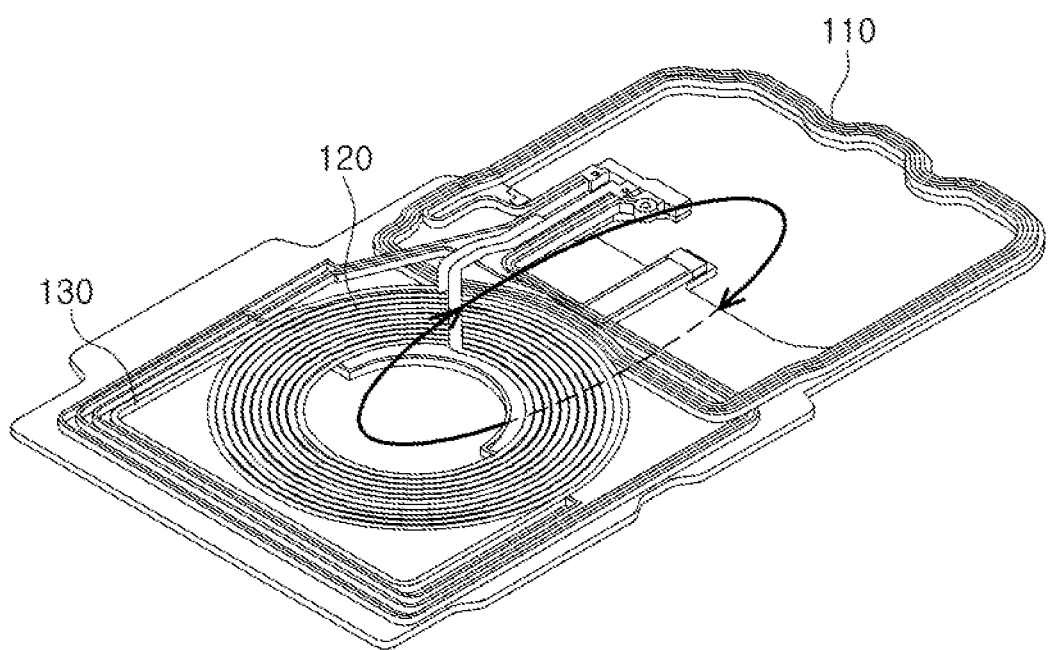
FIG. 6 is a view illustrating an example of a coil module in which a magnetic field passing through centers of two coils is formed.

FIG. 6 is a view illustrating an example of a coil module in which a magnetic field passing through centers of two coils is formed.

FIG. 6 illustrates an example in which one wide magnetic field is formed by the lower coil 120 and the upper coil 110.

That is, the lower coil 120 and the upper coil 110 operate together to form one magnetic field.

The illustrated closed loop illustrates a portion of a plurality of lines of magnetic force representing the magnetic field formed between the two coils. That is, the closed loop illustrates an approximate direction of the magnetic field formed between the two coils.

The magnetic field formed by the coil module is formed by an interaction between a magnetic field formed by the lower coil 120 and a magnetic field formed by the upper coil 110. For example, the magnetic field formed by the lower coil 120 and the magnetic field formed by the upper coil 110 reinforce each other to penetrate through the centers of the two coils to form an extended magnetic field passing through the centers of the two coils like the illustrated lines of magnetic force.

The magnetic field formed between the two coils has a closed loop shape that passes through at least a portion of a region of the lower coil 120 and at least a portion of a region of the upper coil 110. In the illustrated example, the magnetic field is illustrated as the closed loop that passes through the center of the lower coil 120 and the center of the upper coil 110.

That is, referring to the illustrated example, the lines of magnetic force coupled to the two coils upwardly penetrate through the center of the lower coil 120, progress in a direction from the center of the lower coil 120 to the center of the upper coil 110, downwardly penetrate through the center of the upper coil 110, and progress in a direction from the center of the upper coil 110 to the center of the lower coil 120.

As such, the magnetic field formed by the two coils between the two coils has lines of magnetic force of a closed loop passing through the two coils.

As a result, as described above, one large magnetic field is formed using the plurality of coils, such that the strength of a magnetic coupling is increased at any position of the coil module.

Figure 7A:
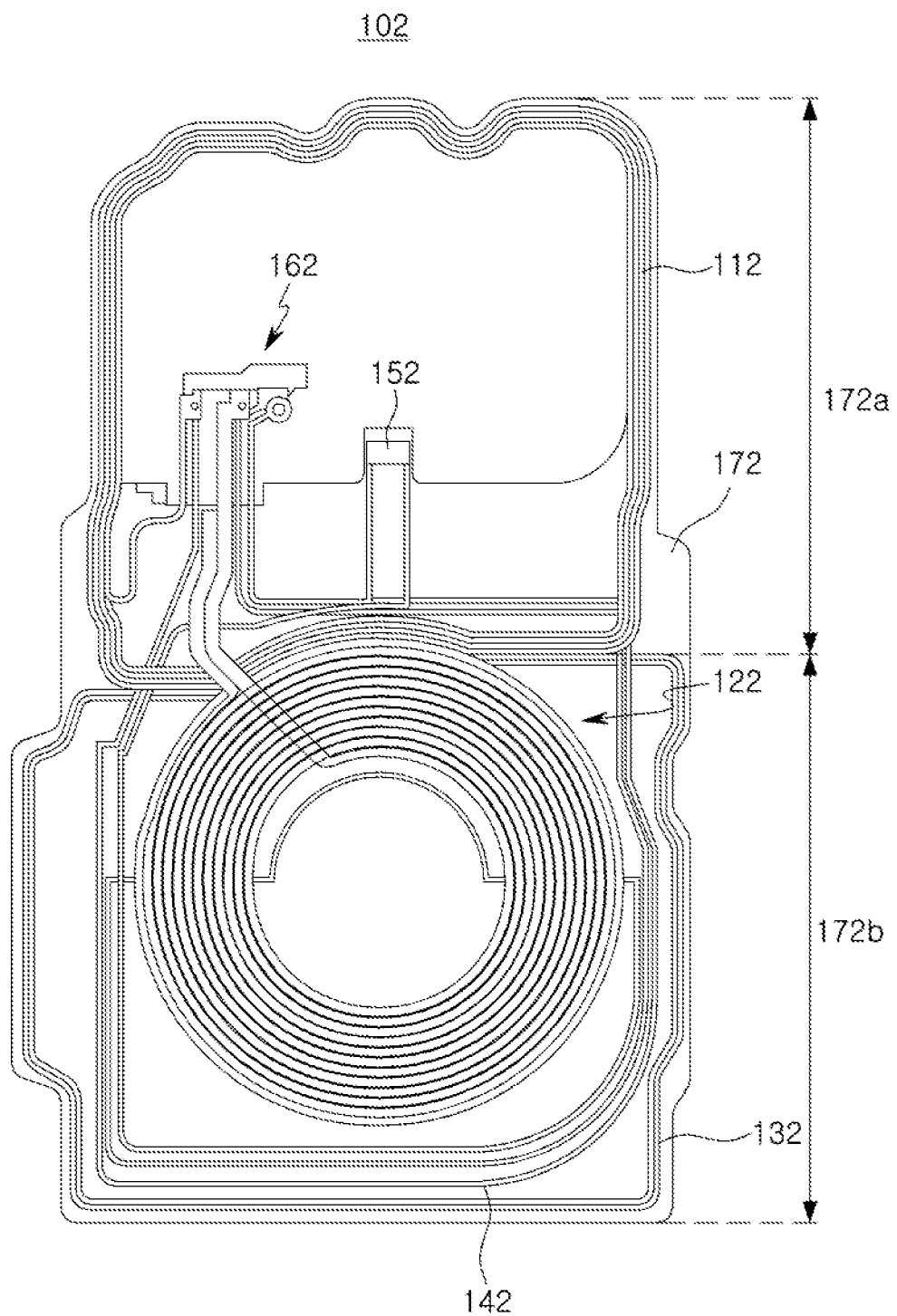
FIG. 7A is a view illustrating another example of a coil module.

FIG. 7A is a view illustrating another example of a coil module.

Referring to FIG. 7A, a coil module 102 includes an upper coil 112 formed in an upper portion 172a of a substrate 172, a lower coil 122 and a lower outer pattern 132 formed in a lower portion 172b of the substrate 172, a local area communications coil 142, a wiring 152, and a terminal part 162.

In the illustrated example, the lower outer pattern 132 is formed as an outer portion of the lower coil 122 and is formed along an outer portion of a lower portion of the coil module 102. That is, a shape of at least a portion of the lower outer pattern 132 corresponds to a shape of at least a portion of the lower portion of the substrate 172 of the coil module.

As illustrated, the local area communications coil 142 is formed in an inner region of the lower outer pattern 132.

In one example, the lower outer pattern 132 is connected in series with the upper coil 112. In another example, the lower outer pattern 132 is connected in series with the lower coil 122.

The lower coil 122 is as a wireless power reception coil, and is also used as the MST coil as described above.

Figure 7B:
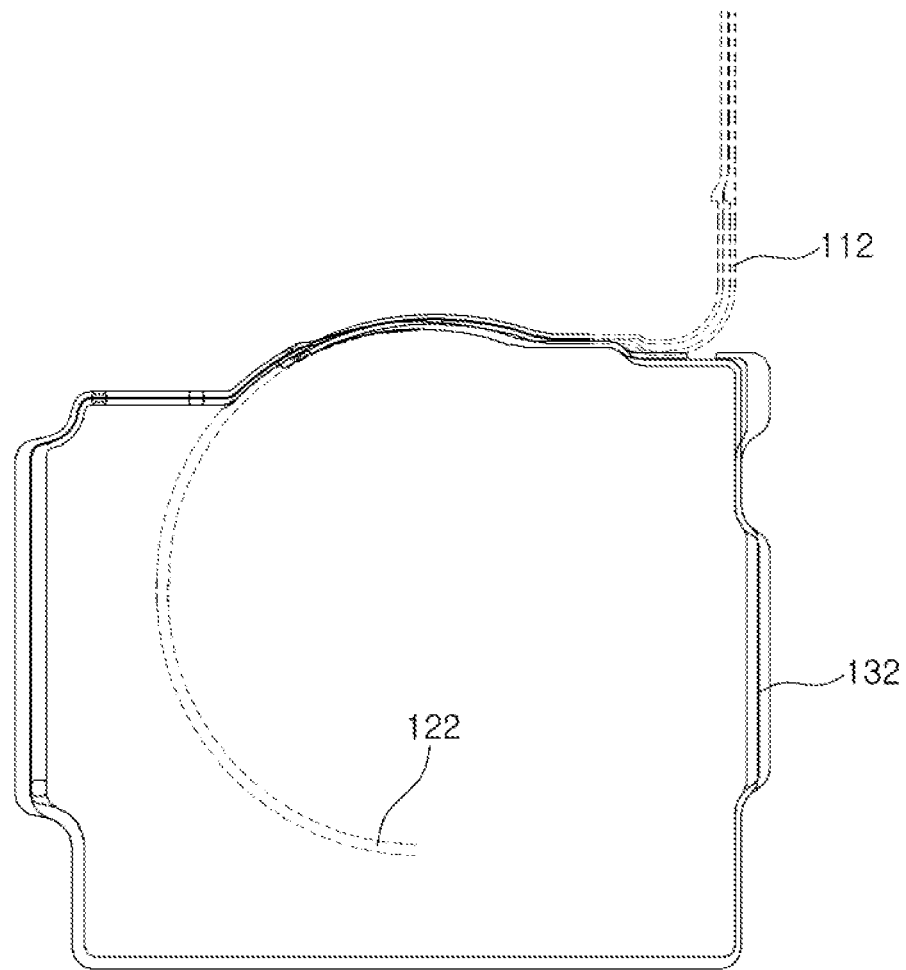
FIG. 7B is a view illustrating an example of a lower outer pattern and a portion of other coils connected to the lower outer pattern in the coil module illustrated in FIG. 7A.

FIG. 7B is a view illustrating an example of a lower outer pattern and a portion of other coils connected to the lower outer pattern in the coil module illustrated in FIG. 7A.

Referring to FIG. 7B, one end of the lower outer pattern 132 is connected in series with one end of the upper coil 112. Although some coils are illustrated to be overlapped with each other in the illustrated example, one end of the lower outer pattern 132 is connected in series to one end of the upper coil, and the lower outer pattern 132 includes several turns wrapped around an outer portion of the lower coil 122. The other end of the lower outer pattern 132 having several turns is connected in series with one end of an outer portion of the lower coil 122. The lower coil 122 is wound inwardly from the outer portion thereof.

In one example, at least a portion of the lower outer pattern 132 corresponds to an outer shape of the substrate.

The number of turns of the lower outer pattern 132 may be set differently depending on a position of the lower outer pattern 132. Referring to the illustrated example, the lower outer pattern 132 has one turn in a lower portion thereof, but has two turns in the left and right portions of the lower portion of the lower outer pattern 132. That is, the lower portion of the lower outer pattern branches in parallel to turn turns in the left and right portions of the lower outer pattern 132. This example increases an area of the lower outer pattern 132 in a space having a large number of empty regions, because the left and right portions of the substrate have a relatively larger number of empty regions than the lower portion of the substrate.

FIG. 7B shows that the upper coil 112, the lower outer pattern 132, and the lower coil 122 are connected in series with each other in this order.

Figure 8:
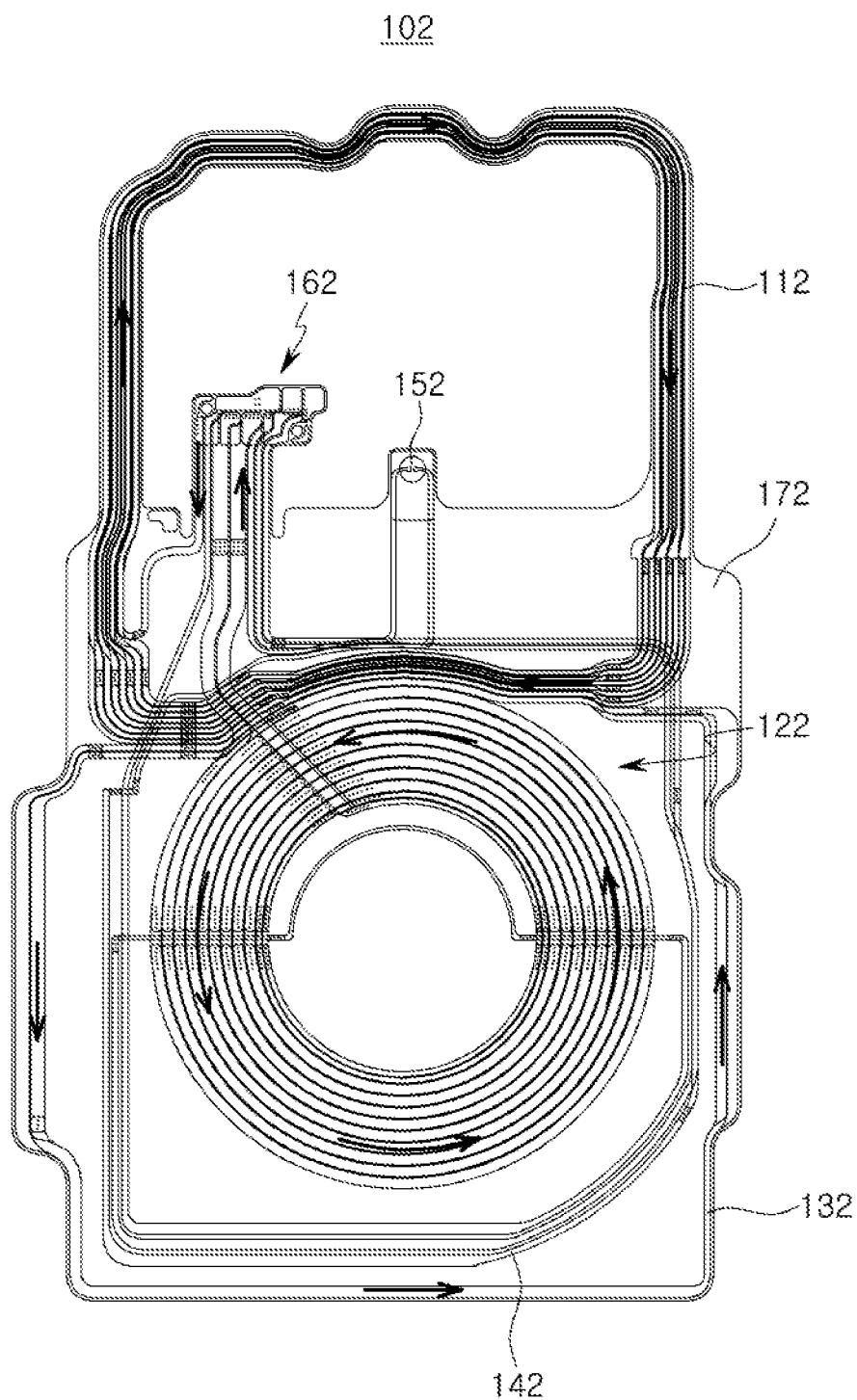
FIG. 8 is a view illustrating an example of a current flow when the coil module illustrated in FIG. 7A operates in a magnetic secure transmission mode.

FIG. 8 is a view illustrating an example of a current flow when the coil module illustrated in FIG. 7A operates in a magnetic secure transmission mode.

Referring to FIG. 8, a current is input to one end of the upper coil 112 via the terminal part 162, and the current flows through the turns of the upper coil 112.

Thereafter, the current flows through the lower outer pattern 132, and then flows through the lower coil 122. However, since a connection relationship between the lower outer pattern 132 and the lower coil 122 may be changed, the flow direction of the current described above may also be changed.

Since the current flows in a figure-eight shape through the upper coil 112, the lower outer pattern 132, and the lower coil 122, a magnetic field is formed in an entire region of the coil module 102.

In addition, as is apparent from the description of FIG. 6, the current in FIG. 8 flows in a clockwise direction in the upper coil 112 and flows in a counterclockwise direction in the lower coil 122 and the lower outer pattern 132, thereby forming a closed-loop magnetic field passing through the centers of the lower coil 122 and the upper coil 112.

Figure 9A:
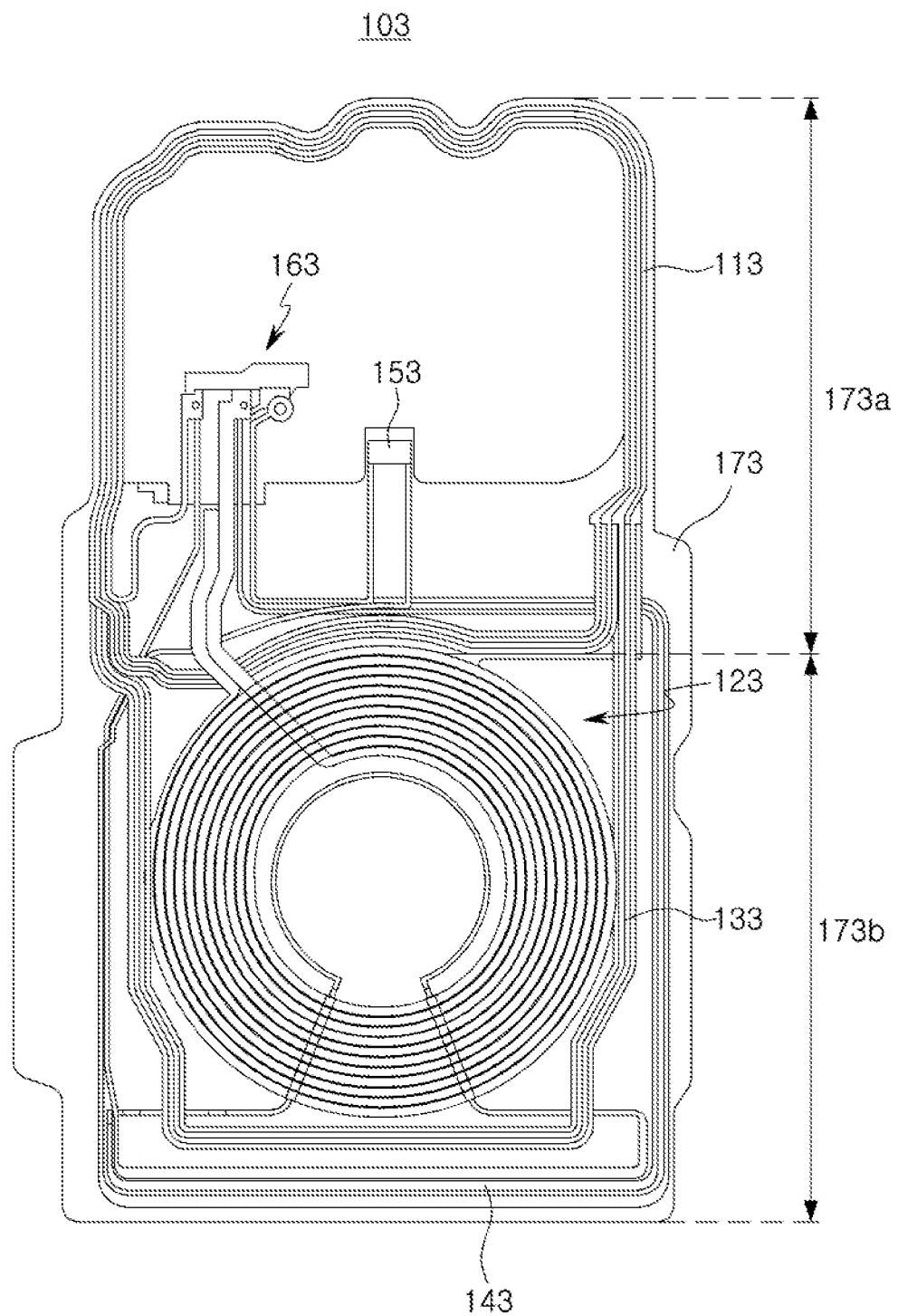
FIG. 9A is a view illustrating another example of a coil module.

FIG. 9A is a view illustrating another example of a coil module,

As illustrated, a coil module 103 includes an upper coil 113 formed in an upper portion 173a of a substrate 173, a lower coil 123 and a lower outer pattern 133 formed in a lower portion 173b of the substrate 173, a local area communications coil 143, a wiring 153, and a terminal part 163.

One end of the lower outer pattern 133 is connected in series to one end of the upper coil 113.

As illustrated, the lower outer pattern 133 forms a loop with a portion of the upper coil 113.

That is, the upper coil 113 forms a loop having a predetermined number of turns in the upper portion 173a of the substrate, and a portion of the upper coil 113 and the lower outer pattern 133 are connected in series with each to form another loop extending from the upper portion 173a of the substrate to the lower portion 173b of the substrate.

Therefore, the number of turns of the upper coil 113 formed in the upper portion 173a of the substrate may be reduced, and an inner space of the upper coil 113 may be increased accordingly.

In addition, since a portion of the upper coil 113 is connected to the lower outer pattern 133 in series to form a loop extending from the upper portion 173a of the substrate to the lower portion 173b of the substrate, the loop forms a magnetic field in the lower portion of the mobile terminal in which a strength of the magnetic field is relatively weak. Therefore, the magnetic field is formed in the entire region of the mobile terminal.

The lower outer pattern 133 may be formed as a double-sided pattern as described above.

The lower outer pattern 133 at an outer side of the lower coil 123 and inside the local area communications coil 143.

In one example, the lower outer pattern 133 is spaced apart from the local area communications coil 143 by a predetermined distance or more, so that an influence by the local area communications coil 143 that does not operate during the MST operation mode is significantly reduced.

Figure 9B:
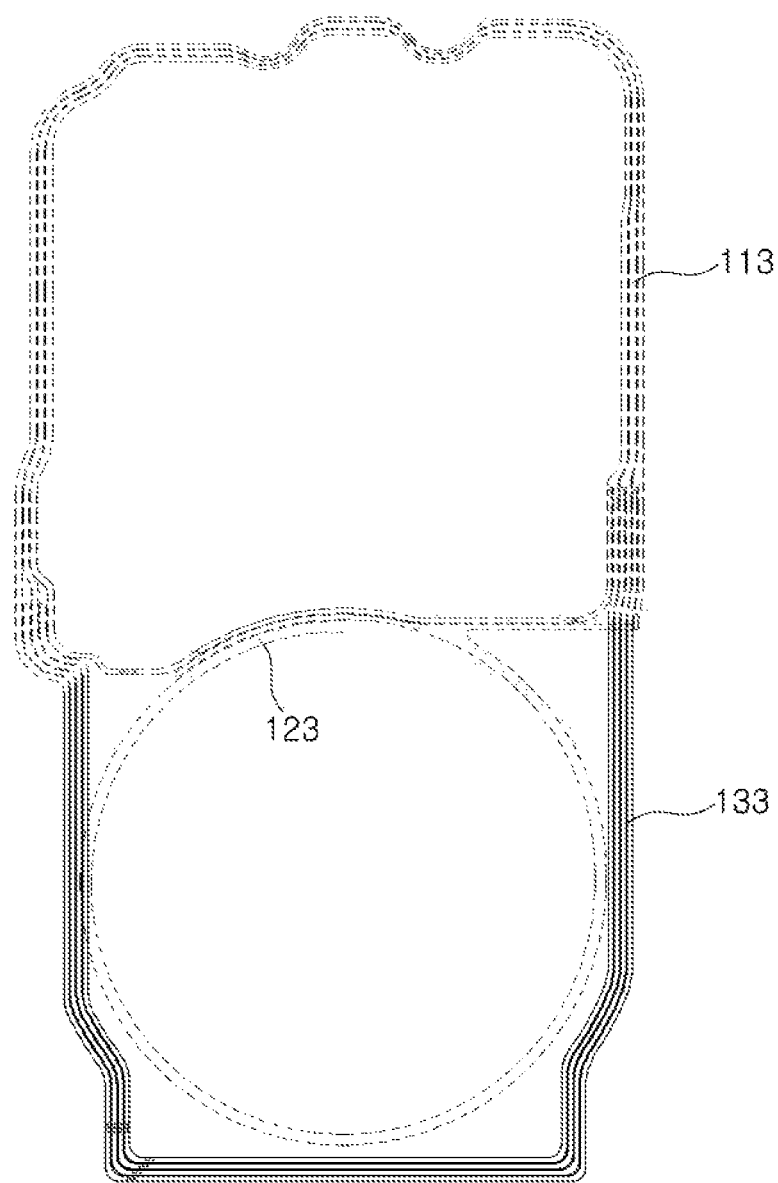
FIG. 9B is a view illustrating an example of a lower outer pattern and a portion of other coils connected to the lower outer pattern in the coil module illustrated in FIG. 9A.

FIG. 9B is a view illustrating an example of a lower outer pattern and a portion of other coils connected to the lower outer pattern in the coil module illustrated in FIG. 9A.

Referring to FIG. 9B, the upper coil 113 forms several turns on the upper surface of the substrate, and the lower outer pattern branches from the upper coil 113 and extends to the lower portion of the substrate.

The upper coil 113 is wound to form several turns and is then connected to one end of an outer portion of the lower coil 123, and the lower coil 123 is wound inwardly to form turns from the outer portion thereof to an inner portion thereof.

The lower outer pattern 133 branches out from the upper coil 113. Therefore, the lower outer pattern 133 does not form any turns by itself, but forms turns together with the upper coil 113.

Assuming that the lower outer pattern 133 is a portion of the upper coil 113, the lower outer pattern 133 is extended turns of the upper coil 113.

For example, the upper coil 113 forms several turns by itself. The upper coil 113 forming several turns is connected to the lower outer pattern 133 to form a loop having several turns extending from the upper portion of the substrate to the lower portion of the substrate.

Figure 10:
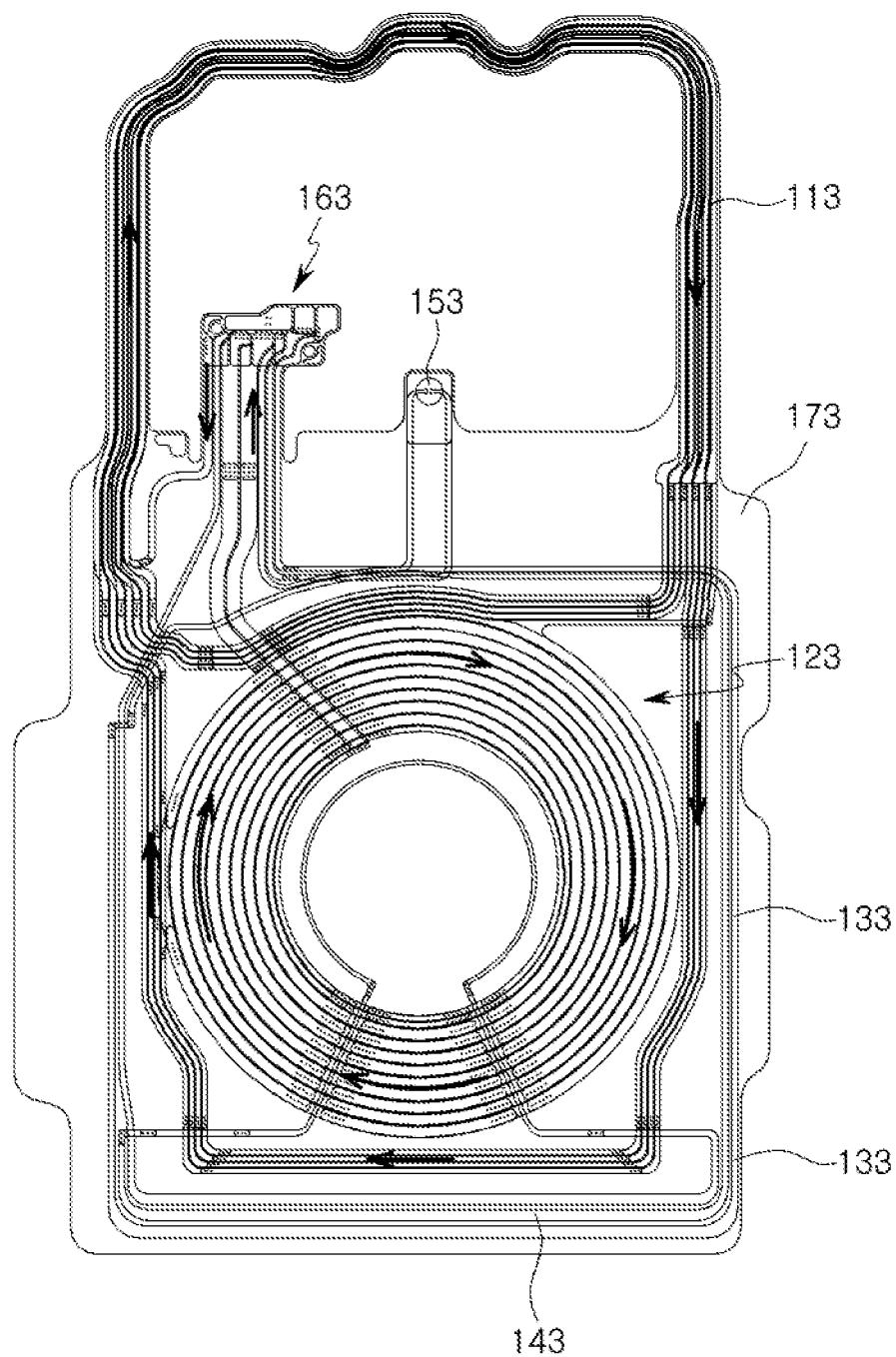
FIG. 10 is a view illustrating an example of a current flow when the coil module illustrated in FIG. 9A operates in a magnetic secure transmission mode.

FIG. 10 is a view illustrating an example of a current flow when the coil module illustrated in FIG. 9A operates in a magnetic secure transmission mode.

Referring to FIG. 10, a current is input to one end of the upper coil 113 via the terminal part 163, and the current flows through the turns of the upper coil 113. In the illustrated example, the current flows in a clockwise direction in a loop through the upper coil 113.

Thereafter, the current flows in the clockwise direction through a large loop extending from the upper portion of the substrate to the lower portion of the substrate while flowing through the upper coil 113 and the lower outer pattern 133.

Thereafter, the current flows in the clockwise direction through the lower coil 123 and is then output to the terminal part 163.

Since a connection relationship between the lower outer pattern 133 and the lower coil 123 may be changed, the flow direction of the current described above may also be changed.

In the illustrated example, the current flows in the same direction, i.e., the clockwise direction, through three different loops.

As the current flows in the three different loops, the magnetic field is uniformly formed in the entire region of the coil module 100.

That is, in the illustrated example, the current flows through a portion of the upper coil 113 while forming a clockwise loop in the upper portion of the substrate, flows through the lower coil 123 while forming a clockwise loop in the lower portion of the substrate, and flows through the portion of the upper coil 113 and the lower outer pattern 133 while forming a clockwise loop in the entire region of the substrate.

A partial offset of the magnetic field in the center region of the substrate may be caused by interference between the loop of the upper portion of the substrate and the loop of the lower portion of the substrate, but since the loop is formed in the entire region of the substrate, the magnetic field is reinforced.

Accordingly, the magnetic field is formed to cover the entire region of the mobile terminal to which the coil module 103 is applied.

Figure 11A:
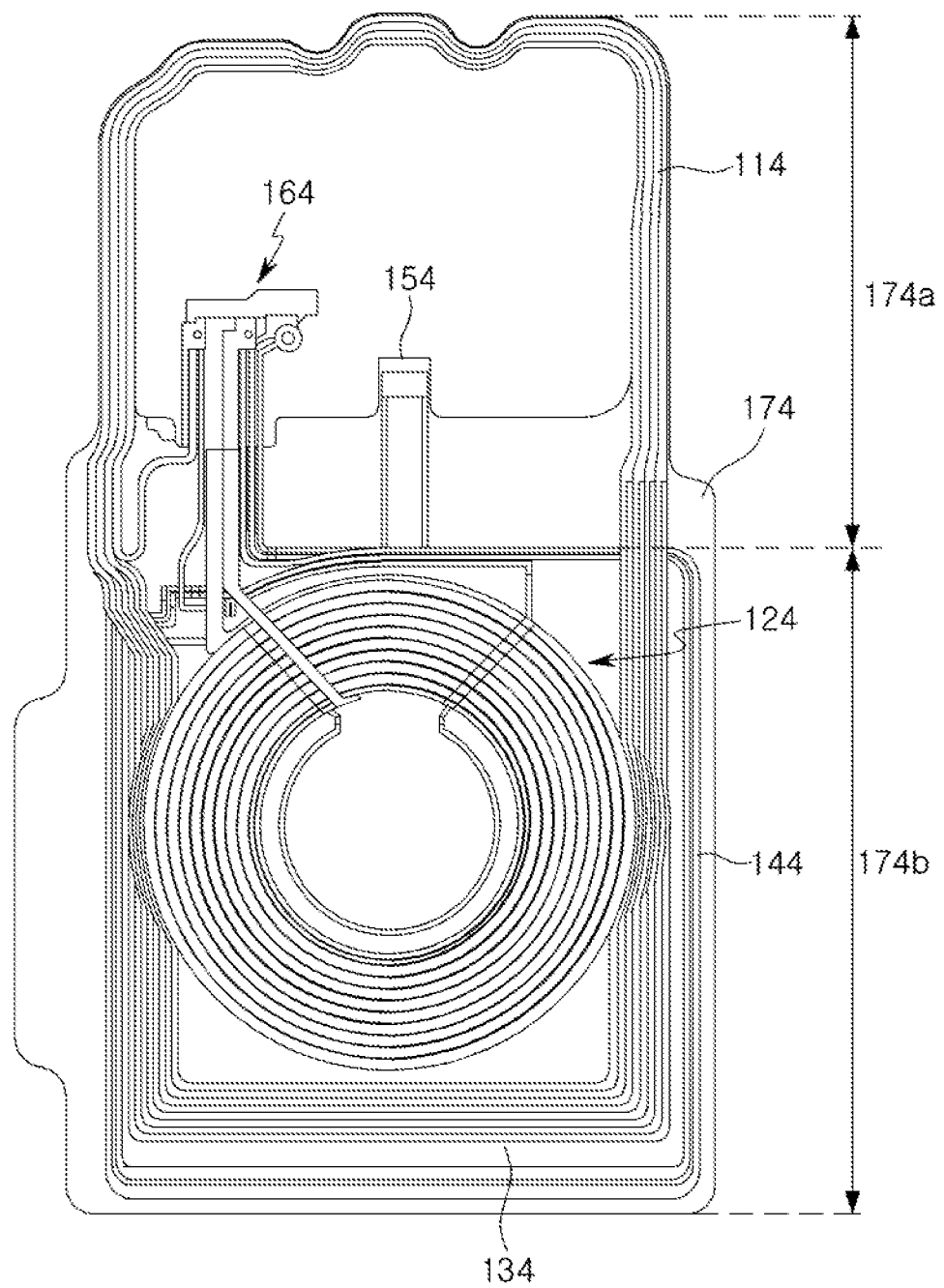
FIG. 11A is a view illustrating another example of a coil module.

FIG. 11A is a view illustrating another example of a coil module.

Referring to FIG. 11A, a coil module 104 includes an upper coil 114 wound to form a first loop across an upper portion 174a and a lower portion 174b of a substrate 174, a lower coil 124 wound to form a second loop in the lower portion 174b of the substrate 174, a local area communications coil 144, a wiring 154, and a terminal part 164.

The upper coil 114 is elongated in a vertical direction to cover a region extending from an upper portion to a lower portion of the coil module 104. Therefore, a portion of the upper coil 114 adjacent to the lower coil 124 is formed to accommodate a shape of a portion of the lower coil 124 adjacent to the upper coil 114.

That is, in the illustrated example, a portion of the upper coil 114 adjacent to the lower coil 124 has an arc shape conforming to a shape of an outer portion of the lower coil 124, and a winding thickness of the arc-shaped portion of the upper coil 114 is smaller than a winding thickness of other portions of the upper coil 114.

The upper coil 114 is formed to have a shape corresponding to a shape of the coil module 104 in the upper portion 174a of the substrate, and is formed in a shape corresponding to a shape of the local area communications coil 144 in the lower portion 174b of the substrate.

In the illustrated example, the portion of the upper coil 114 in the lower portion 174b of the substrate is wider than the portion of the upper coil 114 in the upper portion 174a of the substrate.

The portion of the upper coil 114 in the lower portion 174b of the substrate may be considered to be a lower outer pattern 134. Thus, the upper coil 114 includes the lower outer pattern 134, and this will be described with reference to FIG. 11B.

Figure 11B:
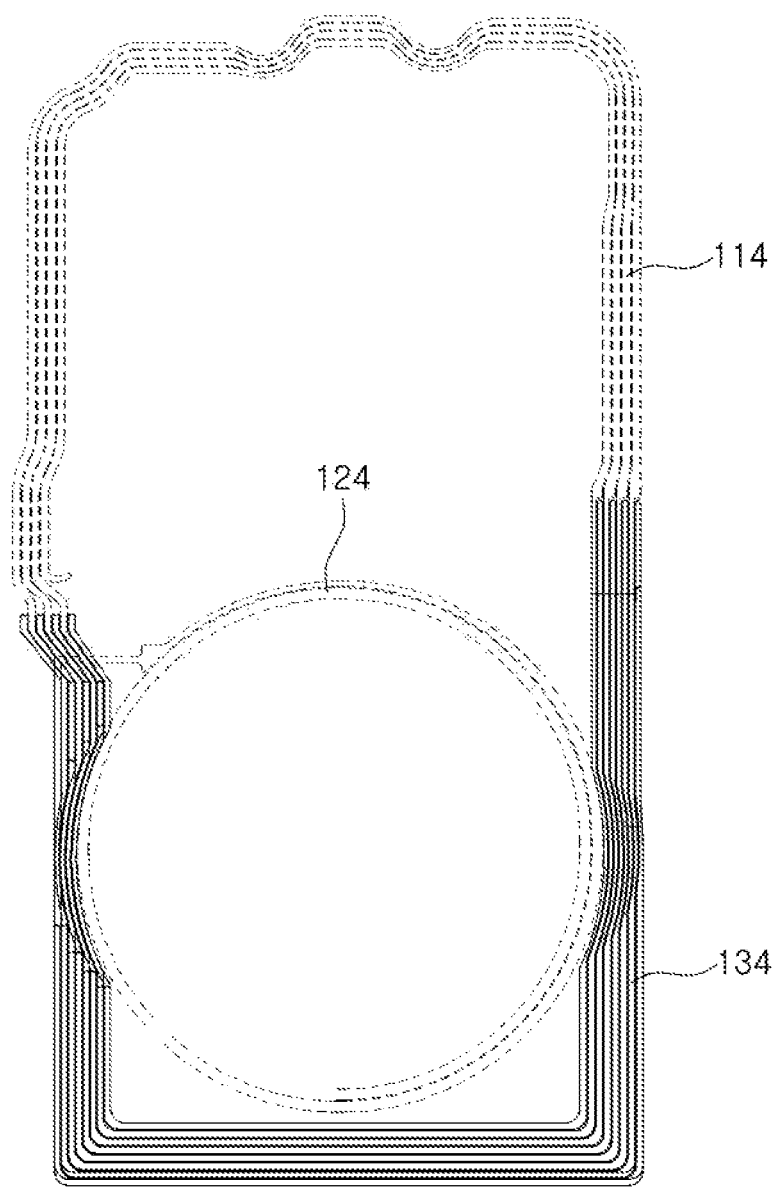
FIG. 11B is a view illustrating an example of a lower outer pattern and a portion of other coils connected to the lower outer pattern in the coil module illustrated in FIG. 11A.

FIG. 11B is a view illustrating an example of a lower outer pattern and a portion of other coils connected to the lower outer pattern in the coil module illustrated in FIG. 11A.

Referring to FIG. 11B, the upper coil 114 is an open curve-shaped pattern that does not form a loop by itself, and is formed in the upper portion of the substrate.

The lower outer pattern 134 is an open curve-shaped pattern that does not form a loop by itself, and is formed in the lower portion of the substrate.

Ends of the upper coil 114 are connected to ends of the lower outer pattern 134. Therefore, the upper coil 114 and the lower outer pattern 134 form a loop having several turns across the upper portion and the lower portion of the substrate.

That is, the lower outer pattern 134 is a portion of the upper coil 114, and in this case, the upper coil 114 is formed in the entire region of the substrate.

Figure 12:
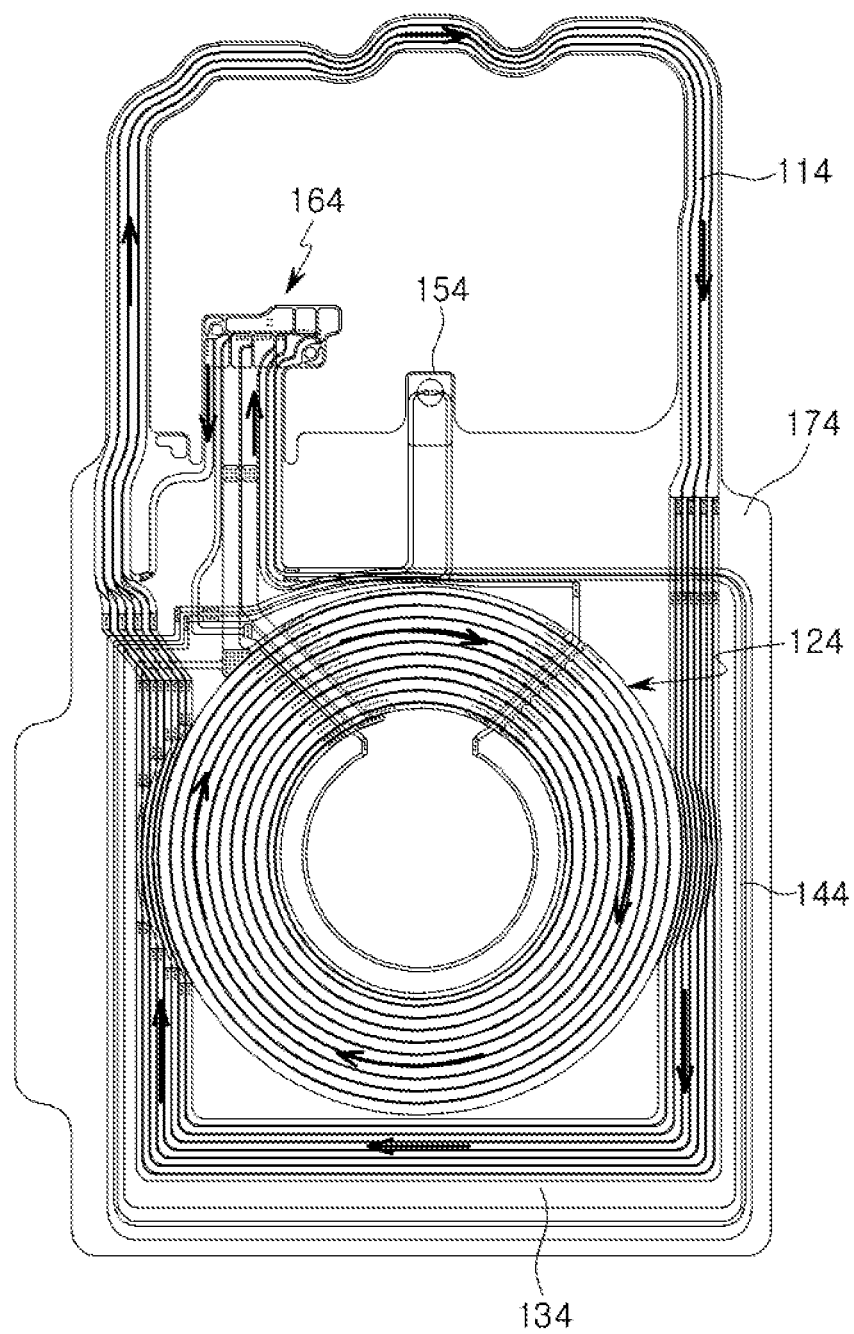
FIG. 12 is a view illustrating an example of a current flow when the coil module illustrated in FIG. 11A operates in a magnetic secure transmission mode.

FIG. 12 is a view illustrating an example of a current flow when the coil module illustrated in FIG. 11A operates in a magnetic secure transmission mode.

Referring to FIG. 12, a current output from the terminal part 164 is input to one end of the upper coil 114, and the current flows through the turns of the upper coil 114. Thereafter, the current flows through the lower coil 124, and is output from the terminal part 164.

Accordingly, the current flows through the upper coil 114 to the lower coil 124, and thus forms a stronger magnetic field in the lower portion of the coil module than in the upper portion thereof.

This further increases a recognition rate when a usage position of the MST corresponds to the lower portion of the mobile terminal according to a user scenario.

Figure 13:
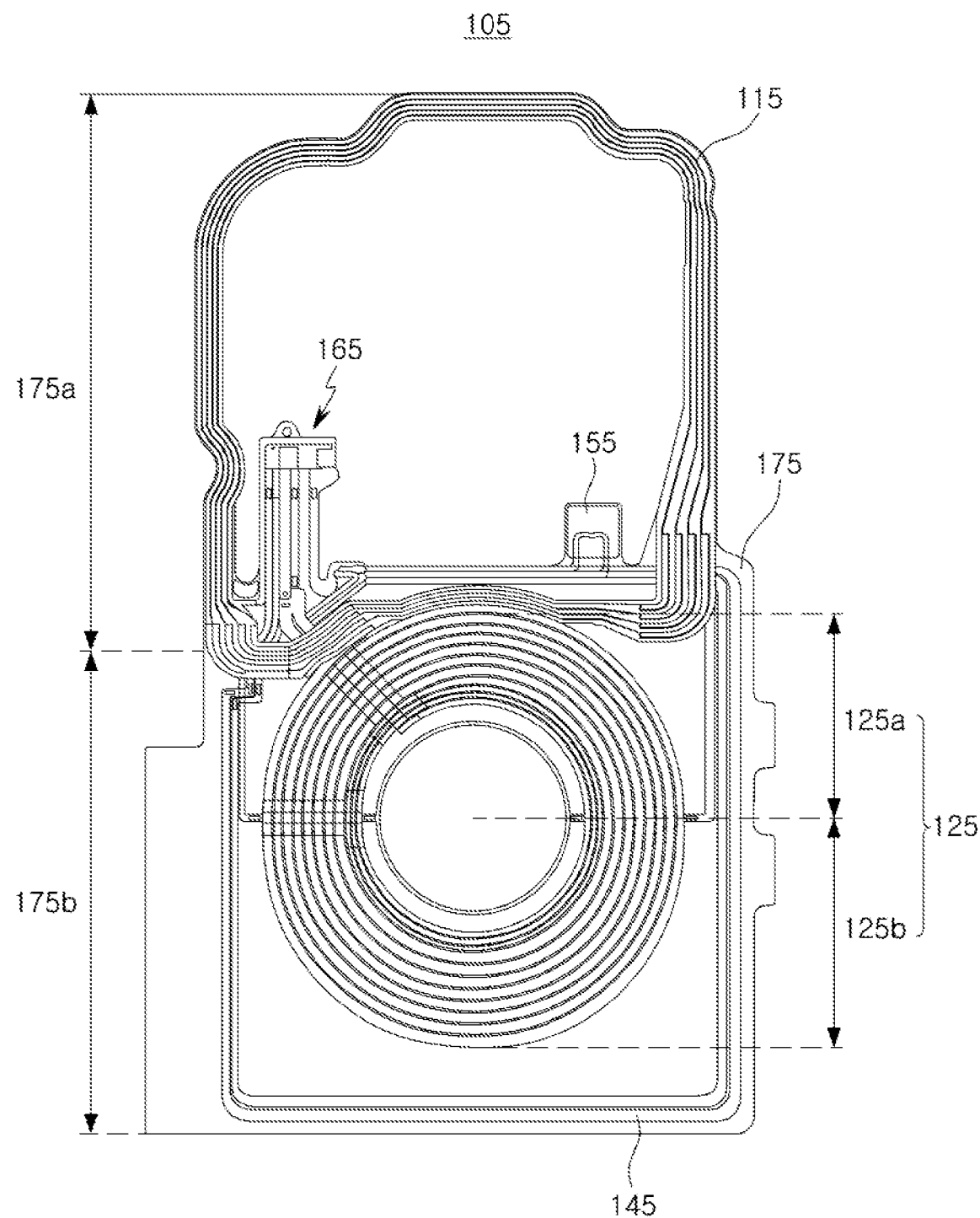
FIG. 13 is a view illustrating another example of a coil module.

FIG. 13 is a view illustrating another example of a coil module.

Referring to FIG. 13, a coil module 105 includes an upper coil 115 formed in an upper portion 175 of a substrate 175, a lower coil 125 formed in a lower portion 175b of the substrate 175, a local area communications coil 145, a wiring 155, and a terminal part 165.

In a case in which the coil module 105 supports the MST function, both the upper coil 115 and the lower coil 125 are activated. In this example, the coil module 105 has a form in which an area of a lower portion of the lower coil 125 is larger than an area of an upper portion of the lower coil 125, thereby enabling the magnetic field to be smoothly formed even in a lower region of the mobile terminal without a separate lower outer pattern.

The lower coil 125 is formed to have an asymmetrical shape so that an area of an upper portion 125a of the lower coil and an area of a lower portion 125b of the lower coil are different from each other.

In the illustrated example, the lower coil is formed to have several turns in a substantially circular shape, and the lower portion 125b of the lower coil, that is, an arc of a lower hemisphere of the circular shape, is longer than the upper portion 125a of the lower coil, that is, an arc of an upper hemisphere of the circular shape.

Accordingly, an internal diameter of the lower coil 125 has a circular shape, but an external diameter thereof has an asymmetrical shape in which the lower portion 125b of the lower coil 125 is extended toward a lower end portion of the coil module 105.

That is, in the illustrated example, an area of the lower portion 125b of the lower coil 125 is greater than that of the upper portion 125a of the lower coil 125.

Thus, in the example illustrated in FIG. 13, the lower coil 125 is formed asymmetrically to increase a width of the lower coil 125 in a direction toward an empty space, i.e., in the illustrated example, a portion the lower end portion of the coil module 105 between the lower coil 125 and the local area communications coil 145, in which no pattern is formed in the coil module 105, so that the lower coil 125 enters the empty space. As a result, the MST recognition rate may be increased.

Figure 14:
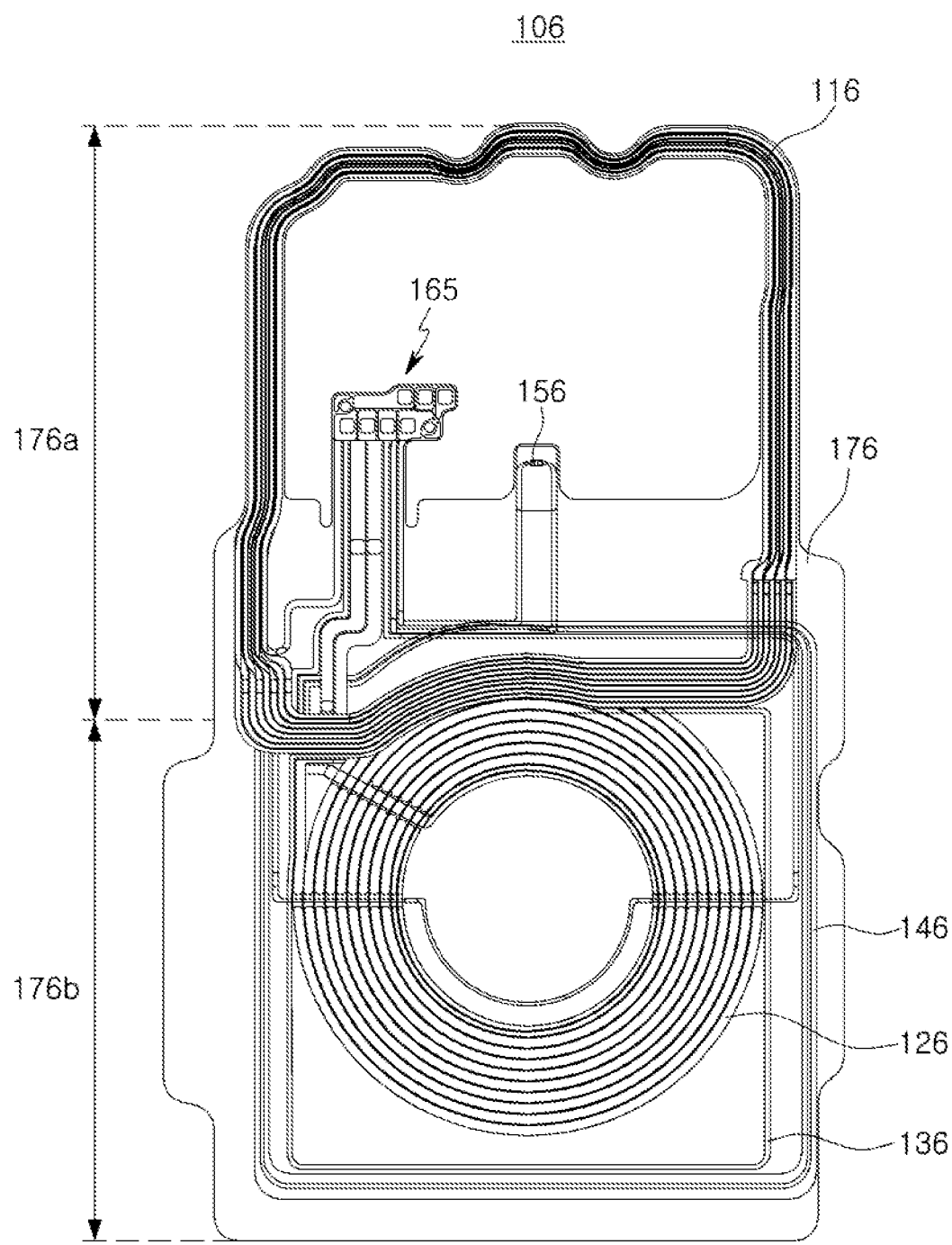
FIG. 14 is a view illustrating another example of a coil module.

FIG. 14 is a view illustrating another example of a coil module.

Referring to FIG. 14, a coil module 106 includes an upper coil 116 formed in an upper portion 176a of a substrate 176, a lower coil 126 and a lower outer pattern 136 formed in a lower portion 176b of the substrate 176, a local area communications coil 146, a wiring 156, and a terminal part 166.

At least a portion of the upper coil 116 overlaps at least a portion of the lower coil 126.

In the illustrated example, a left lower end portion of the upper coil 116 is formed in an arc shape to overlap a left upper end portion of the lower coil 126.

The overlap of the coils is not limited to a case in which the coils directly overlap each other, but also includes a case in which one of the coils is formed on the upper surface of the substrate and the other one of coils is formed on the lower surface of the substrate, and overlap with each other when the coil module 106 is viewed in a direction perpendicular to the plane of FIG. 14.

Since portions of the plurality of coils overlap each other, miniaturization and slimness of the substrate may be satisfied.

FIGS. 15A through 15D are views illustrating MST recognition regions of a comparative example and the examples of FIGS. 3A, 7A, and 9A.

Figure 15A:
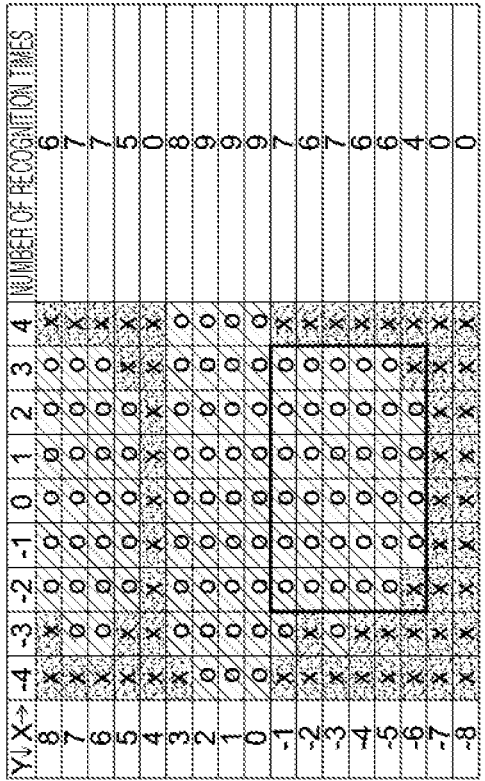
FIGS. 15A through 15D are views illustrating MST recognition regions of a comparative example and the examples of FIGS. 3A, 7A, and 9A.
Figure 15C:
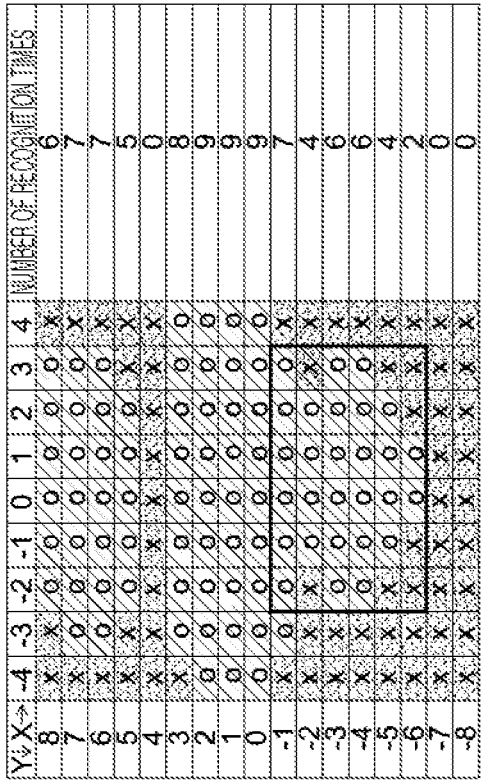
Figure 15B:
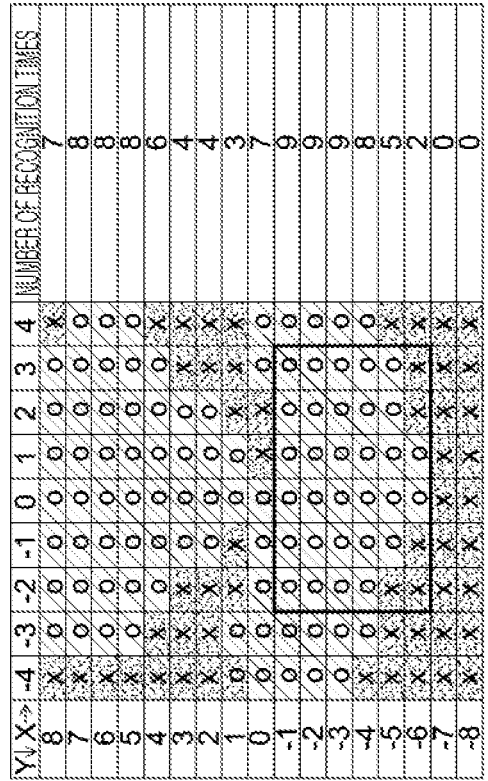
Figure 15D:
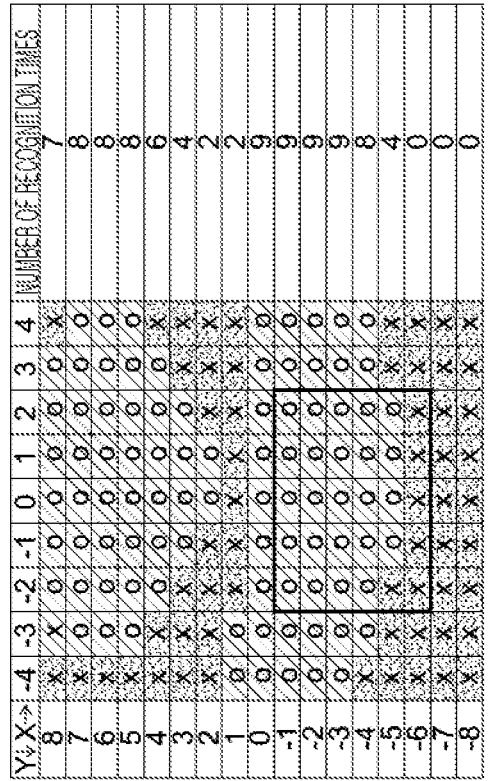

FIGS. 15A through 15D were obtained by operating a coil module as an MST coil and determining whether it was possible to perform MST recognition at 153 points arranged in a 9×17 grid, i.e., 17 rows spaced 1 cm apart in the Y direction each containing 9 points spaced 1 cm apart in the X direction. FIG. 15A illustrates an MST recognition region of a comparative example without the lower outer pattern described in this application, FIG. 15B illustrates an MST recognition region of the example illustrated in FIG. 3A, FIG. 15C illustrates an MST recognition region of the example illustrated in FIG. 7A, and FIG. 15D illustrates an MST recognition region of the example illustrated in FIG. 9A.

In FIGS. 15A through 15D, the boxes extending from X=−2 to X=3 and Y=−1 to Y=−6 are regions corresponding to the lower portion of the coil module, "O" denotes a point in at which it was possible to perform MST recognition, and "X" denotes a point at which it was not possible to perform MST recognition. Thus, the "O"s in FIGS. 15A through 15D denote an MST recognition region for the corresponding example.

As can be seen from FIGS. 15A through 15D, MST recognition could not be performed in lower corner regions of the lower region of the coil module in the comparative example of FIG. 15A, while the region in which MST recognition could be performed was enlarged in the lower portion of the coil module as well as around the coil module in the examples of FIGS. 15B through 15D.

By dividing the number of points at which it was possible to perform MST recognition by the total number of points at which MST recognition was attempted (153 points in the illustrated examples) to obtain an MST recognition rate, the MST recognition rate of the comparative example of FIG. 15A is 89/153=58.17%, the MST recognition rate of the example of FIG. 15B is 96/153=62.75%, the MST recognition rate of the example of FIG. 15C is 93/153=60.78%, and the MST recognition rate of the example of FIG. 15D is 97/153=63.40%. Therefore, it can be seen that the MST recognition region is larger in the examples of FIGS. 15B through 15D corresponding to the examples of FIGS. 3A, 7A, and 9A than in the comparative example of FIG. 15A.

Figure 16A:
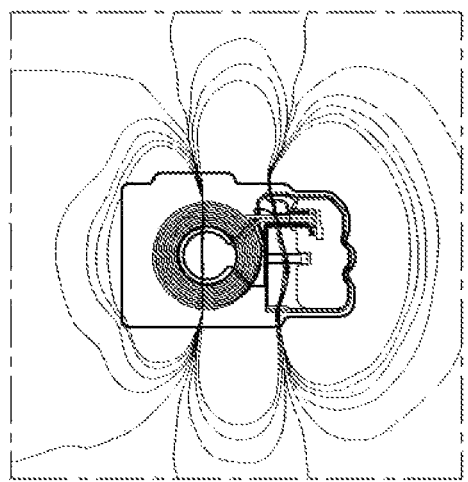
FIGS. 16A through 16C are views illustrating magnetic field intensity contour maps of a comparative example and the examples of FIGS. 7A and 9A.
Figure 16B:
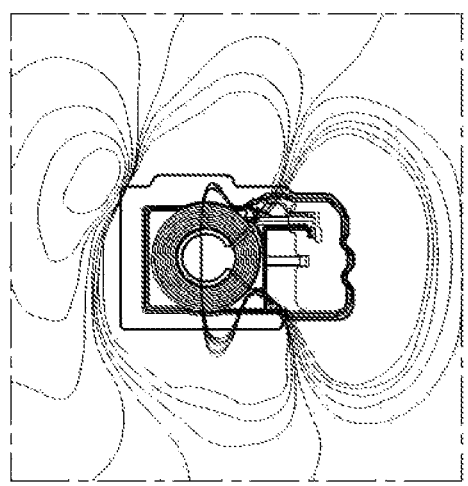
Figure 16C:
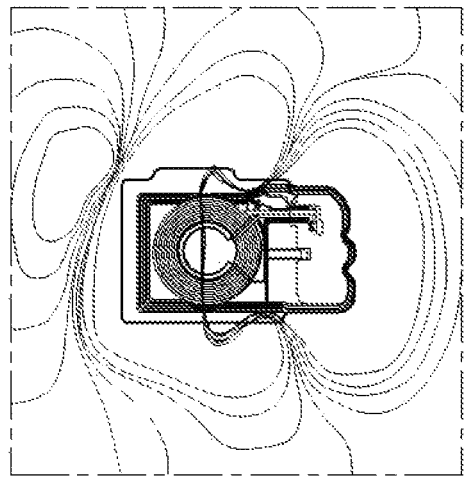

FIGS. 16A through 16C are views illustrating magnetic field intensity contour maps of a comparative example and the examples of FIGS. 7A and 9A.

FIG. 16A illustrates a magnetic field intensity contour map of a comparative example without the lower outer pattern described in this application, FIG. 16B illustrates a magnetic field intensity contour map of the example illustrated in FIG. 7A, and FIG. 16C illustrates a magnetic field intensity contour map of the example illustrated in FIG. 9A.

The coil module is arranged in a horizontal direction in FIGS. 16A through 16C, and the left side corresponds to the lower portion of the coil module, and the right side corresponds to the upper portion of the coil module.

In the illustrated examples, the contour lines represent different intensities of the magnetic field. Each contour line represents a different magnetic field intensity, and the magnetic field intensity is the same at all points on a particular contour line. The closer a particular contour line is to the coil module, the greater is the magnetic field intensity represented by that particular contour line. Therefore, the magnetic field intensity in a region between the coil module and a particular contour line is greater than the magnetic field intensity represented by that particular contour line.

As can be seen from FIGS. 16A through 16C, in the comparative example of FIG. 16A, the magnetic field in the lower portion of the coil module covers a relatively small area, while in the examples of FIGS. 16B and 16C corresponding to the examples of FIGS. 7A and 9A, the magnetic field in the lower portion of the coil module covers a relatively wide area.

Accordingly, in the examples described in this application, the strength of the magnetic coupling is increased not only in the upper portion of the coil module, but also in the lower portion of the coil module, and the MST recognition rate is increased accordingly.

As set forth above, the examples of the coil module including the lower outer pattern described in this application may be included in an electronic device such as a mobile terminal to support wireless power reception, local area communications, and magnetic secure transmission.

In addition, the examples of the coil module including the lower outer pattern described in this application increase the degree of freedom of a layout of a camera module or other component included in a mobile terminal, thereby increasing space utilization in the mobile terminal.

In addition, the examples of the coil module including the lower outer pattern described in this application enable a plurality of coils to be efficiently arranged on one substrate.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A coil module comprising: a substrate;
an upper coil on at least one surface of the substrate in an upper portion of the substrate;
a lower coil on at least one surface of the substrate in a lower portion of the substrate, the lower coil having a plurality of turns and a substantially circular shape;
a lower outer pattern outside the lower coil in the lower portion of the substrate and connected to either one or both of the upper coil and the lower coil; and
a local area communications coil outside the lower outer pattern in the lower portion of the substrate, the local area communications coil having a shape corresponding to a shape of a lower end portion of the substrate,
wherein an upper portion of the lower outer pattern has a shape of a circular arc wrapped around an upper portion of the lower coil, and a lower portion of the lower outer pattern has a shape corresponding to the shape of the lower end portion of the substrate.

2. The coil module of claim 1, wherein a portion of the lower outer pattern has a shape corresponding to a shape of at least a portion of the lower coil.

3. The coil module of claim 1, wherein
the upper coil forms a first loop in the upper portion of the substrate, and
the lower coil forms a second loop in the lower portion of the substrate.

4. The coil module of claim 3, wherein the lower outer pattern forms a third loop outside the second loop in the lower portion of the substrate.

5. The coil module of claim 4, wherein
the upper coil is configured to enable a current to flow in a first direction in the first loop, and
the lower coil and the lower outer pattern are configured to enable a current to flow in a second direction opposite to the first direction in the second loop and the third loop.

6. The coil module of claim 4, wherein the upper coil, the lower coil, and the lower outer pattern are configured to enable a current to flow in a same direction in the first loop, the second loop, and the third loop.

7. The coil module of claim 3, wherein
the upper coil forms a first loop in the upper portion of the substrate, and
a portion of the upper coil is connected in series with the lower outer pattern to form, together with the lower outer pattern, a third loop in the upper portion of the substrate and the lower portion of the substrate.

8. The coil module of claim 1, wherein one end of the lower outer pattern is connected to one end of the upper coil.

9. The coil module of claim 1, wherein one end of the lower outer pattern is connected to one end of the lower coil.

10. The coil module of claim 1, wherein
one end of the lower outer pattern is connected to one end of the upper coil,
another end of the lower outer pattern is connected to one end of an outer portion of the lower coil, and
the lower coil is wound from the outer portion of the lower coil to an inner portion of the lower coil.

11. The coil module of claim 1, wherein
the upper coil forms a first loop in the upper portion of the substrate and the lower portion of the substrate,
the lower coil forms a second loop in the lower portion of the substrate, and
the lower outer pattern is a portion of the upper coil in the lower portion of the substrate.

12. The coil module of claim 11, wherein
the second loop is inside the first loop, and
the upper coil and the lower coil are configured to enable a current to flow in a same direction in the first loop and the second loop.

13. The coil module of claim 1, wherein at least a portion of the upper coil overlaps at least a portion of the lower coil.

14. The coil module of claim 1, wherein
the lower coil is configured to be activated in response to the coil module operating in a wireless power reception mode, and
the upper coil, the lower coil, and the lower outer pattern are configured to be activated in response to the coil module operating in a magnetic secure transmission mode.

15. A coil module comprising: a substrate;
an upper coil on at least one surface of the substrate in an upper portion of the substrate;
a lower coil on at least one surface of the substrate in a lower portion of the substrate, the lower coil having a plurality of turns and a substantially circular shape;
a lower outer pattern outside the lower coil in the lower portion of the substrate and connected to either one or both of the upper coil and the lower coil; and
a local area communications coil outside the lower outer pattern in the lower portion of the substrate, the local area communications coil having a shape corresponding to a shape of a lower end portion of the substrate,
wherein the lower coil has an asymmetrical shape in which an area of an upper portion of the lower coil is different from an area of a lower portion of the lower coil, and
wherein an upper portion of the lower outer pattern has a shape of a circular arc wrapped around the upper portion of the lower coil, and a lower portion of the lower outer pattern has a shape corresponding to the shape of the lower end portion of the substrate.

16. The coil module of claim 15, wherein
a first arc of a lower hemisphere of the substantially circular shape is longer than a second arc of an upper hemisphere of the substantially circular shape.

17. A coil module comprising:
a substrate;
a first coil in a first portion of the substrate;
a second coil in a second portion of the substrate, the second coil having a plurality of turns and a substantially circular shape;
an outer pattern outside the second coil in the second portion of the substrate and connected to either one or both of the first coil and the second coil; and
a local area communications coil outside the outer pattern in the second portion of the substrate, the local area communications coil having a shape corresponding to a shape of a lower end portion of the second portion of the substrate,
wherein a first portion of the outer pattern has a shape of a circular arc wrapped around a first portion of the second coil, and a second portion of the outer pattern has a shape corresponding to the shape of the lower end portion of the second portion of the substrate.

18. The coil module of claim 17, wherein
the first portion of the substrate and the second portion of the substrate abut each other at a boundary between the first portion of the substrate and the second portion of the substrate,
the first portion of the substrate extends from a first edge of the substrate to the
boundary between the first portion of the substrate and the second portion of the substrate, and
the second portion of the substrate extends from a second edge of the substrate to the boundary between the first portion of the substrate and the second portion of the substrate.

19. The coil module of claim 17, wherein one end of the first coil is connected to a first end of the outer pattern, and a second end of the outer pattern is connected to one end of the second coil, thereby enabling a current to flow sequentially through the first coil, the outer pattern, and the second coil.

20. The coil module of claim 19, wherein
the first coil forms a first loop in the first portion of the substrate,
the second coil forms a second loop in the second portion of the substrate, the outer pattern forms a third loop in the second portion of the substrate outside the second loop, either by itself or in conjunction with at least a portion of the first coil, and the first coil, the second coil, and the outer pattern are configured to enable the current to flow in a first direction in the first loop and a second direction opposite to the first direction in the second loop and the third loop, or to flow in a same direction in the first loop, the second loop, and the third loop.

\* \* \* \* \*